US007251587B2

(12) United States Patent
Bondarev et al.

(10) Patent No.: US 7,251,587 B2
(45) Date of Patent: Jul. 31, 2007

(54) FLEXIBLE SCANNING AND SENSING PLATFORM

(75) Inventors: Vadim Bondarev, Bellevue, WA (US); Eric R. Brooks, Woodinville, WA (US)

(73) Assignee: System to ASIC, Inc., Bothell, WA (US)

( * ) Notice: Subject to any disclaimer, the term of this patent is extended or adjusted under 35 U.S.C. 154(b) by 220 days.

(21) Appl. No.: 10/639,768

(22) Filed: Aug. 11, 2003

(65) Prior Publication Data

US 2004/0104717 A1 Jun. 3, 2004

Related U.S. Application Data

(60) Provisional application No. 60/402,628, filed on Aug. 12, 2002.

(51) Int. Cl.
*G06F 11/00* (2006.01)
*G01V 3/08* (2006.01)

(52) U.S. Cl. .................................. 702/188; 324/329

(58) Field of Classification Search ............... 702/188; 398/106; 323/909; 340/539.16, 518, 521; 324/329; 250/203.2
See application file for complete search history.

(56) References Cited

U.S. PATENT DOCUMENTS

| | | | | |
|---|---|---|---|---|
| 4,550,312 A | * | 10/1985 | Galloway et al. | ...... 340/539.16 |
| 5,029,245 A | * | 7/1991 | Keranen et al. | ............ 250/205 |
| 5,099,193 A | | 3/1992 | Moseley et al. | ............ 323/324 |
| 5,318,197 A | | 6/1994 | Martindale et al. | ............. 222/1 |
| 5,730,219 A | | 3/1998 | Tubel et al. | ............. 66/250.01 |
| 6,457,642 B1 | * | 10/2002 | Good et al. | ............ 235/462.01 |
| 6,480,304 B1 | | 11/2002 | Os et al. | ..................... 358/474 |
| 6,826,369 B1 | * | 11/2004 | Bondarev et al. | ........... 398/107 |

FOREIGN PATENT DOCUMENTS

WO    WO 9219984 A1 * 11/1992

OTHER PUBLICATIONS

Marszalec et al., A Photoelectric Range Scanner Using an Array of LED Chips, May 1992, International Conference on Robotics and Automation, 1992 IEEE, pp. 593-598.*
Yamaji et al., The Motor Driving Control of X-Y-Z Table Utilizing Photoelectric Device and Optical Pattern Recognition, 1992 IEEE, pp. 401-406.*
Barker, D., The Advantage of Multiple-Zone Metal Detection over Conventional Single Zone Detectors, Summer 97, The Technology Interface, pp. 1-6.*
Shilo et al., MM-Band Radiometric System for Contraband Detection Applications, Jun. 4-9, 2001, MSMW'2001 Symposium Proceedings, pp. 463-465.*

* cited by examiner

*Primary Examiner*—John Barlow
*Assistant Examiner*—Toan M. Le
(74) *Attorney, Agent, or Firm*—Seed IP Law Group PLLC

(57) ABSTRACT

A detection method and apparatus that includes a controller and a plurality of remote sensor units, each containing sensor elements, connected to the controller to achieve custom detection profiles and resolutions that are optimized for a given application by alteration of scanning sequences used by the controller, variation of scanning frequencies, adjustment in response times, and utilization of multi-modal sensing methods.

51 Claims, 28 Drawing Sheets

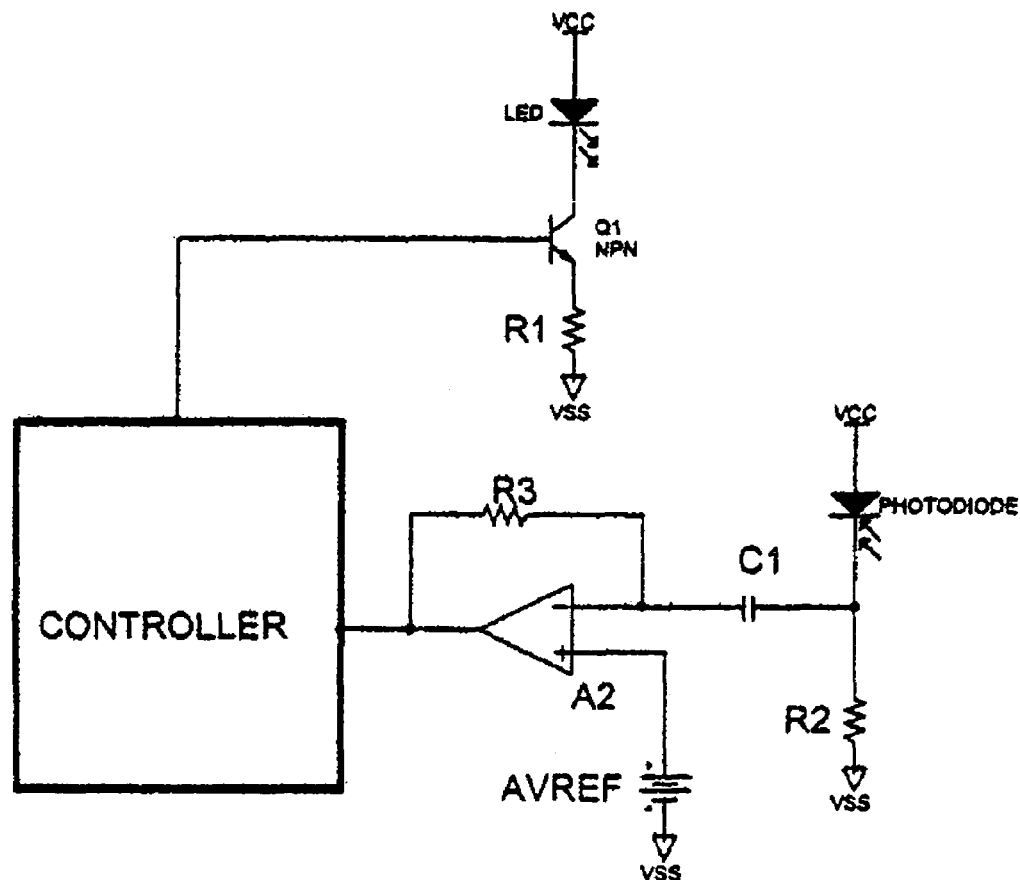
FIG. 16B
NO DETECT
DETECT
FIG. 16A

NO DETECT

DETECT

TABLE 1

| Step | Operation | Detail |
|---|---|---|
| 1 | Enable Receiver Channel | EN=H for each RX_MUX, disconnect all RX_MUX outputs from ADC input<br>Load RX_MUX address buss with Receiver channel to be sampled (A0,A1,A3)<br>EN=L for selected RX_MUX, ADC input is output of addressed Receiver channel |
| 2 | Enable Transmitter Channel | EN=H, all TX_MUX – memory mode<br>Load TX_MUX address buss with selected transmitter channel (A0,A1,A2)<br>EN=L for selected TX_MUX, start selected transmitter<br>Delay X μsec for LED Source pulse duration<br>EN=H for selected TX_MUX, stop selected transmitter |
| 3 | Process Received Signal | CS=L, Apply clock cycle to ADC – HOLD signal from selected RX_MUX<br>Clock out remaining ADC sequence – present digitized signal to μC<br>CS=H, Reset ADC sequencer |
| 4 | Store Sample | Load digitized sample for integrator |
| 5 | Complete Sample Set | Repeat Steps 1 through 4 until all samples for selected channels are loaded |
| 6 | Process Sample Set | Apply integrator algorithm to acquired Sample Set<br>Store result in location corresponding to selected channel |
| 7 | Complete Scan | Determine next channel to be sampled based on Scanner algorithm<br>Repeat Steps 1 through 6 until all channels processed |
| 8 | Process Scan Results | Apply Scanner algorithm to stored samples<br>Update internal registers to target states for Scanner Outputs and indicators |
| 9 | Update Output Channel | EN = H, RST =H for all OUT_MUX controlling Output Drive – memory mode<br>Load OUT_MUX address buss with channel to be modified (A0,A1,A2)<br>Din = H, "ON" state, Din = L "OFF" state<br>EN =L for selected OUT_MUX, latch Din state to selected Output Drive channel<br>EN=H for selected OUT_MUX, memory mode, hold channel state |
| 10 | Complete Output Update | Repeat Step 9 until all Output Drive channels are loaded with target state, as defined by Scanner algorithm |
| 11 | Service Serial Port | Test Serial port input buffer for commands received from external control<br>Process received commands and output requested data<br>Update configuration changes to Scanning algorithm |
| 12 | Repeat Scanner Sequence | Continuously run Steps 1 through 12 |

FIGURE 23

TABLE 2

| Format | | 1 Start, 8 Data, 1 Stop, No Parity |
|---|---|---|
| Baud Rates | | 9.6, 19.2, 38.4 Kbaud |
| Data | | 8 bit hex, no control character recognition |
| | | |
| Command | Hex | Function |
| Query Root | 01 | Return Model & Health Status from Scanner |
| Busy | 02 | Echo's command + 1 byte 00= Ready FF=Busy |
| Reset | 03 | Restart Sensor, Run through Pwr-Up sequence, Clear output faults |
| Mute | 04 | Disable Outputs until "Reset" or Pwr-Up cycle |
| Test | 05 | Disable TX, Scan channels, Verify "No-Detect" on all channels |
| Run | 06 | Exits "Setup" mode of scanner, Latches condition & resumes operation |
| Setup | 07 | Initiates scanner "Setup" mode, Also toggles to next "Setup" state |
| | | |
| Query Mode | 10 | Return scanner Mode/Algorithm control settings |
| Load Mode | 11 | Send Mode/Algorithm control settings to scanner |
| | | |
| Query Beam | 20 | Return Beam Status/Configuration settings from Scanner |
| Load Beam | 21 | Send Beam Configuration settings to Scanner |
| Query Outputs | 22 | Return Output Status/Configuration settings from Scanner |
| Load Outputs | 23 | Send Output Configuration settings to Scanner |
| Query Inputs | 24 | Return Input Status/Configuration settings from Scanner |
| Load Inputs | 25 | Send Input Configuration settings to Scanner |
| | | |
| Query I/O Status | 30 | Return snapshot of current Output and Input status |
| Stream Sensor Status | 31 | Report 1 Byte sensor status every scan (Minimal response time impact) |
| Stream Analog | 32 | Report individual beam strength following each beam sample |
| Stream Beam Status | 33 | Report Beams blocked every cycle |

FIGURE 24

FLEXIBLE SCANNING AND SENSING PLATFORM

CROSS REFERENCE TO RELATED DOCUMENTS

This application is related to provisional patent Ser. No. 60/402,628 filed on Aug. 12, 2002, entitled "Flexible scanning, sensing platform and a method for direct visual identification of a target location within a beam pattern and system sensitivity control by means of a transmitted signal adjustment" naming Vadim Bondarev and Eric Brooks. The provisional application is hereby incorporated by reference as if disclosed fully herein. Applicants hereby claim priority under 35 U.S.C. 119(e) of this provisional patent application.

BACKGROUND OF THE INVENTION

1. Field of the Invention

The present invention pertains to a detection system and method, and more particularly to a flexible platform for scanning and sensing and related method for identification of a target within a detection field.

2. Description of the Related Art

Photoelectric scanners and sensors are widely used in industrial applications for detection, measurement, identification and differentiation of objects. Sensors might for example incorporate a photoelectric transmitter and receiver that detects the presence or absence of varying amounts of light transmitted from the transmitter and received by the receiver as an indication of the presence or absence, type, or position of an object. Scanners might for example incorporate multiple transmitter and receiver channels, which are scanned one after another to determine the presence or absence of varying amounts of light transmitted from an individual transmitter and received by a corresponding receiver.

Industrial scanners are most commonly made in the form of two bars, with one bar containing receivers and another bar containing transmitters. In a typical application the bars are positioned in such a manner as to form a light curtain, consisting of a multitude of light beams between individual emitters and receivers. When an object to be detected blocks all or a portion of the light curtain, the scanner indicates the presence of such an object by asserting its output. Another common implementation of the scanner is in the form of a single bar where both the receiver and transmitter are integrated adjacent to each other within the same housing. In this case, the light curtain is formed with a retro-reflective tape mounted opposite of the scanner. Another common implementation of an industrial scanner is in the form of a fork or rectangle, with transmitters and receivers mounted opposite of each other to form a light curtain. One of the limitations of present scanner architectures is that the distance between the transducer elements within each bar is fixed, and consequently so is the dimension of the detection profile. To meet the demands of high resolution (close beams) and height of coverage (long scanners), a multitude of models must be manufactured. Furthermore, the user is not able to customize beam location and is therefor unable to achieve a desired mix of resolutions and detection profiles. These restrictions dramatically increase cost and drastically reduce overall penetration of the scanner technology into industrial sensing applications.

In many applications, scanners are required to perform an operation or suspend execution of an operation in response to external input. An example of such an operation is a measuring scanner, whose measurement timing is determined by the stand-alone sensor used as an event trigger. Practical implementation of this relatively simple application requires the use of a stand-alone scanner, a stand-alone controller, such as a Programmable Logic Controller, and a stand-alone sensor. The complexity and cost, as well as multiple potential failure points of such an installation, limits the use of such present scanners to areas where no alternatives are practical. Mechanical installation requirements of present scanners, which tend to be large and bulky, are incompatible with relatively small areas allocated to sensing equipment and therefor further limit penetration of the scanners into applications traditionally dominated by sensors. The performance of present scanners is highly limited by the sequential nature of their architecture, where each individual element is activated one after another until a complete scan is performed. Such architecture neither allows for any part of the scanner to function at a response time that is different from the remainder of the scanner nor does it allow for flexible assignment of scanning sequences. Although flexible scanning capability is highly desirable in more traditional scanning applications, especially as it relates to the combination of scanning and sensing, it is essential for sensing equipment that incorporates multiple mechanisms of sensing, such as photosensors, IR, RF ultrasound etc, where the difference in response times of the transducers is substantial.

BRIEF SUMMARY OF THE INVENTION

The disclosed embodiments of the present invention overcome many of the foregoing problems by providing a low cost Flexible Scanner and Sensor (FLEXI) architecture as will be described hereinafter. In accordance with one embodiment of the present invention, a flexible scanning and sensing platform is provided that includes a controller and a plurality of remote sensor units, each containing sensor elements, connected to the controller by means of cable, such as a twisted pair. The remote units can be operated in opposed or proximity mode, in either synchronous or asynchronous manner, and can be adapted to perform any type of sensing including photoelectric, inductive, capacitive, magnetic, IR, ultrasound, RF, temperature, pressure, PIR, etc. The remote units can be positioned to achieve custom detection profiles and resolutions that are optimized for a given application. Furthermore, custom profiles and resolutions can be achieved by alteration of scanning sequences used by the controller. Control of scan frequencies allows remote units in one area of the detection profile to operate at a different effective response time than remote units in other areas of the detection profile, thus providing for a degree of control required by multi-mode sensor and scanner applications. These and other advantages allow FLEXI to provide cost effective, enhanced performance solutions to the areas of industrial sensing and scanning that have not been achieved by present art sensors and scanners.

In accordance with one embodiment of the invention, a detection apparatus is provided that includes a plurality of remote sensing units, and a single controller coupled to the plurality of remote sensing units, the controller configured to activate each remote sensing unit in one of either a simultaneous mode and a predetermined activation sequence mode.

In accordance with another embodiment of the invention, a detection method is provided that includes providing multiple remote sensing units; and providing a controller coupled to the multiple remote sensing units and configuring the controller to independently control each remote sensing unit in accordance with multiple modalities and to process outputs independently from each of the remote sensing units.

BRIEF DESCRIPTION OF THE SEVERAL VIEWS OF THE DRAWINGS

The foregoing features and advantages of the invention will be more readily appreciated as the same become better understood from the following detailed description when taken in conjunction with accompanying drawings, wherein:

FIGS. 16A-16F are schematics illustrating examples of implementation and timing for direct visual identification of the target location within a beam pattern;

FIG. 23 is a table of the sequence of operation of one embodiment of the present invention; and FIG. 24 is a table defining a serial interface in accordance with the present invention.

DETAILED DESCRIPTION OF THE INVENTION

While the disclosed embodiments of the invention are susceptible of implementation in many different forms, there is shown on the drawings and will herein be described in detail specific embodiments, with the understanding that the present disclosure is to be considered as an example of the principles of the invention and not intended to limit the invention to the specific embodiments shown and described.

Figure 1:
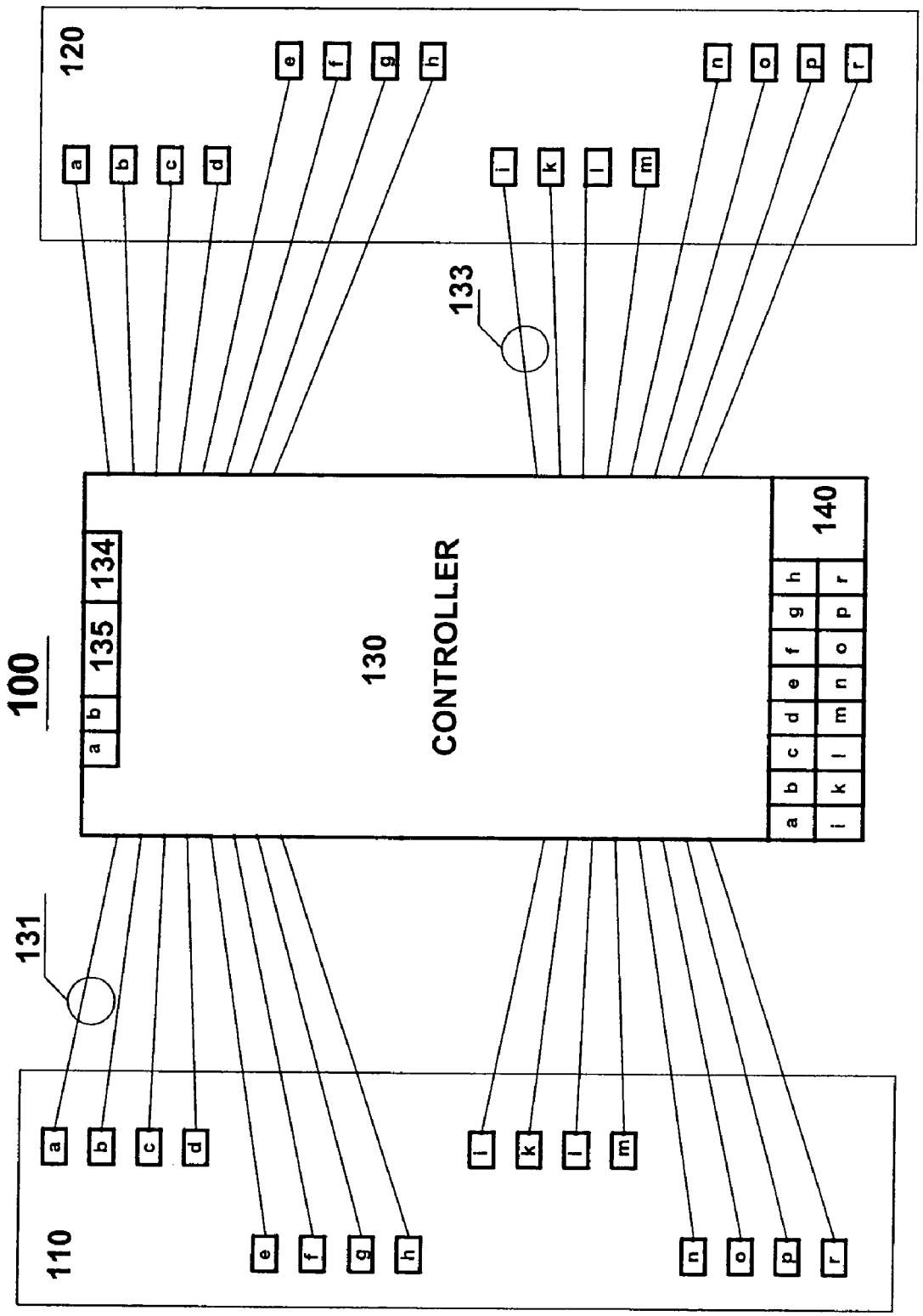
FIG. 1 is an overall block diagram of an embodiment of the flexible scanner and sensor platform of the present invention.
Figure 2:
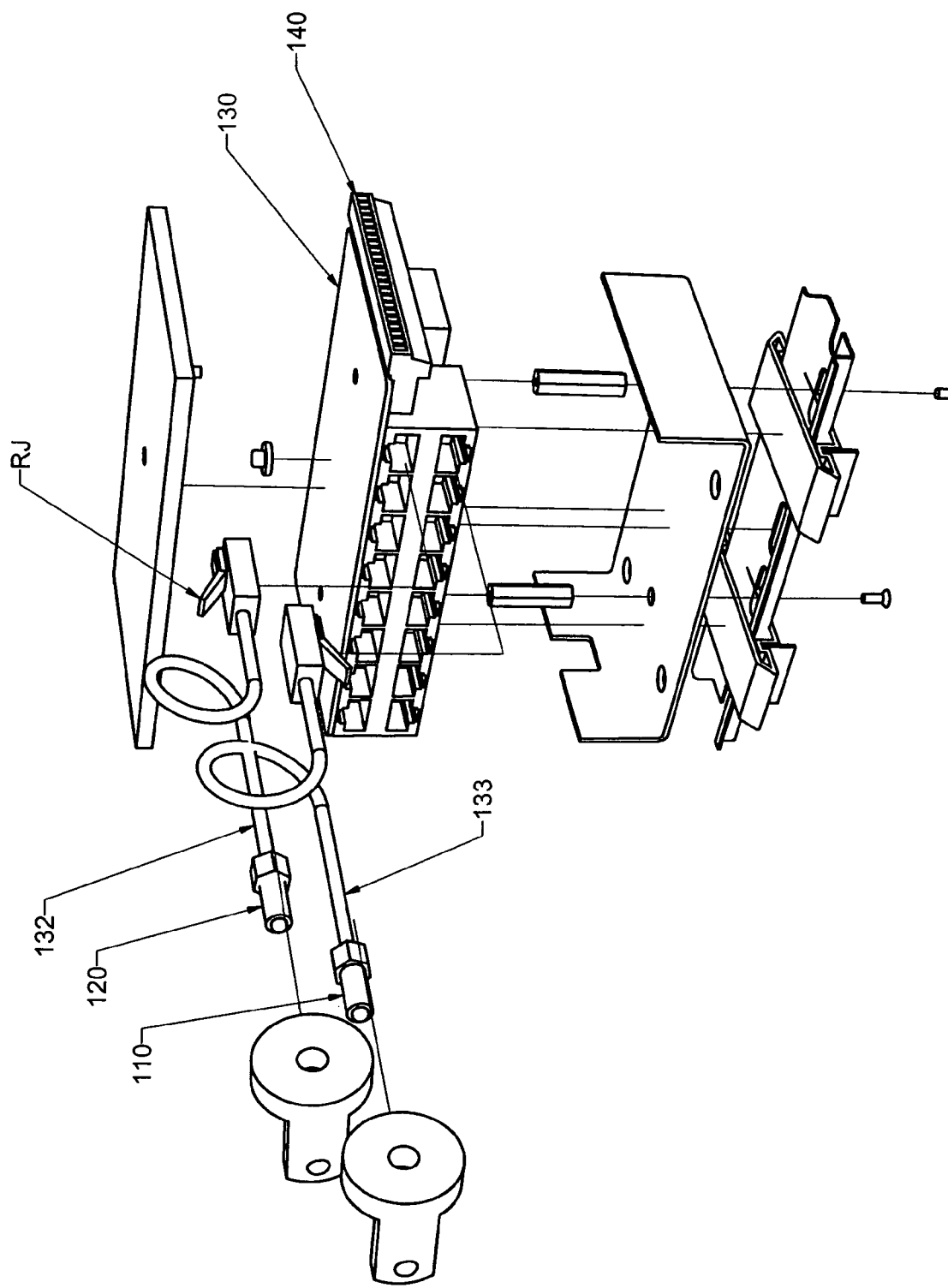
FIG. 2 is an exploded isometric projection of a mechanical implementation of the embodiment of the flexi scanner and sensor platform of FIG. 1.

Referring now to FIGS. 1 and 2, a Flexible Scanning and Sensing Platform (FLEXI) in accordance with one embodiment of the present invention is generally shown as 100. The platform 100 includes remote receiver units 110 and remote transmitter units 120 in cooperation with a controller 130. The remote receiver and transmitter units 110, 120 can, for example, be housed in separate packages, as would be the case for an opposed optical system, or they can be combined in the same housing, as would be the case for proximity inductive or proximity optical systems. The remote receiver units 110 are individually connected to the controller by means of a 3-wire cable 131. The remote transmitter units 120 are individually connected to the controller 130 by means of a 2-wire cable 133. The controller 130 accepts programming signals and provides status information via a serial interface 134 using the well-known RS232 protocol format. It should be apparent that although the RS232 format is used in this particular embodiment of the invention, any protocol used for serial or parallel communication would comfortably accomplish the required tasks.

The controller 130 can also receive inputs via a discrete input interface 135, and such inputs can, for example, be used for the purpose of test, external interrupt, configuration selection, etc. Discrete outputs 140 are used by FLEXI 100 to control external devices in response to the commands from the controller. The function of the discrete outputs 140 can be defined via a serial interface, discrete input, or via controller default setting. The definitions of discrete outputs and inputs are determined by the programming of the controller 130.

In this exemplary embodiment of the invention, RJ-45 interface connectors have been used to terminate two cables 131 and 133 into the controller 130, and the RJ-11 interface connector has been used to terminate at the serial interface 134. The choice of connectors should not be considered limiting since FLEXI's architecture contemplates operation with any of the standard industrial connectors, including direct terminal wiring. Referring to FIG. 2, FLEXI has been designed for effortless integration into an existing industrial environment, and the remote units 110, 120 can be positioned using standard off the shelf brackets or threaded directly into the target equipment. The controller 130 can be fitted with a standard DIN rail bracket for easy, trouble-free installation into any industrial facility.

Figure 3:
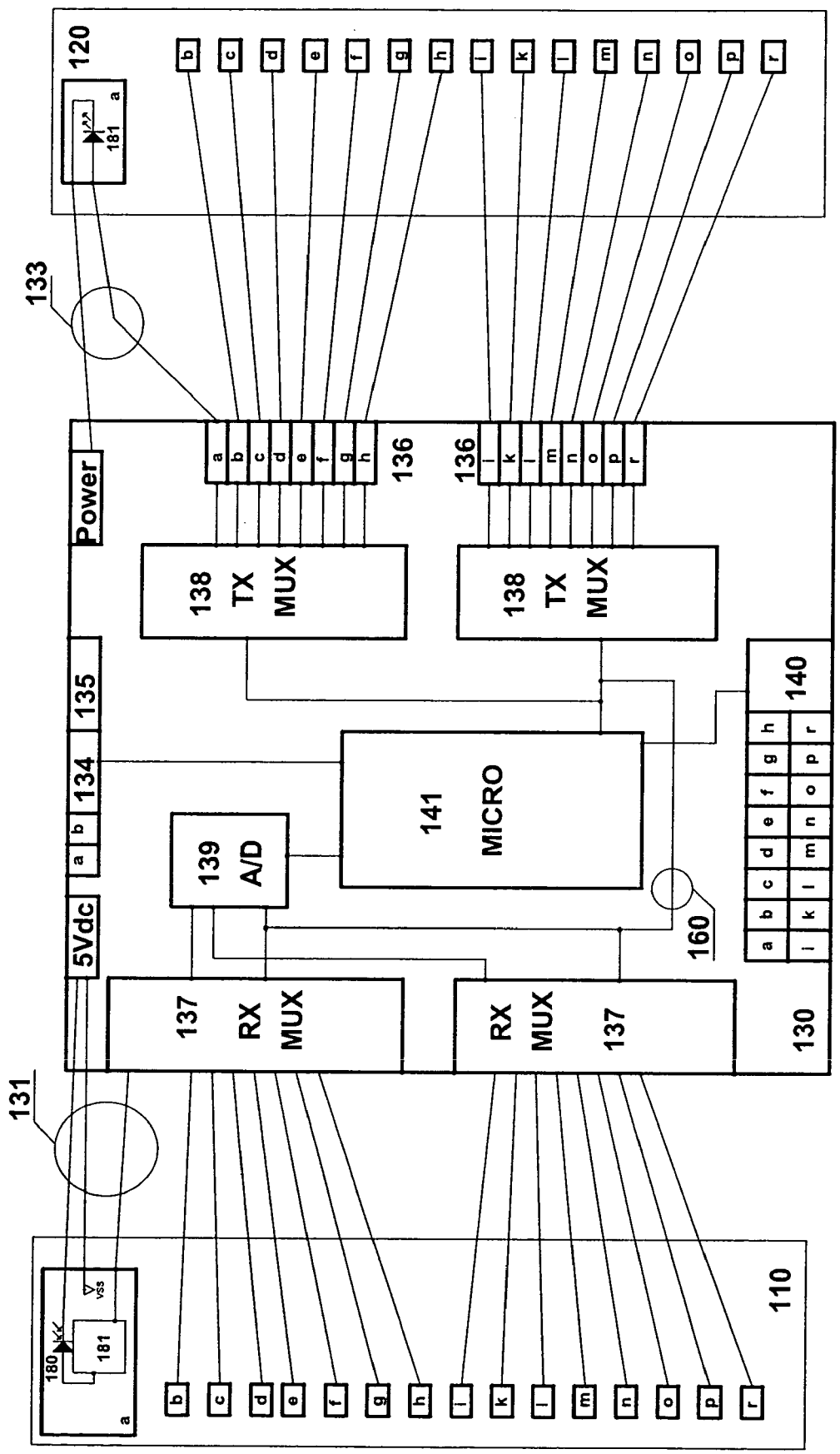
FIG. 3 is detailed diagram of the embodiment of a flexible scanner and sensor platform of FIG. 1.

Referring now to FIG. 3, the controller 130 is implemented by a receive multiplexer 137, a transmit multiplexer 138, transmit drivers 136, an A/D converter 139, an input interface 135, and an output multiplexer and interface 140 in cooperation with a microcontroller 141. The microcontroller 141 controls the sequence and timing of operation by means of a common control bus 160. The microcontroller 141 may be a commercially available microcontroller, such as the PIC16F870. This microcontroller is RISC based microcontroller with on-board EEPROM from Microchip Technology, Inc. Other suitable microcontrollers can of course be used as will be known to those skilled in the art. The multiplexer 137 may be the commercially-available unit 74HC4051, and the multiplexer 138 may be the commercially-available unit 74HC259. The transmit driver 136 may be a plurality of commercially available transistors, such as the unit BCV47 and current setting resistors. The discrete input section may be implemented by commercially available transistors, such as the BCX70. The serial interface may be the commercially-available unit MAX221 E RS232 controller from Maxim Integrated Products, Inc., and the discrete output section may be implemented by the commercially-available unit BCW 66h. The A/D converter may be the commercially-available LTC1196 converter from Linear technology, Inc. Since the frequency of operation required by state-of-the-art photoelectric sensors is approaching 1 MHz, a fast A/D converter should be used to properly process a received signal. Referring to FIG. 3, an operating sequence is initiated by the microcontroller 141, enabling single or multiple channels on the transmit multiplexer 138 as well as single or multiple channels on the receive multiplexer 137. The drive transistors 136 associated with selected channels of the transmit multiplexer 138, alone with input power, are connected to a remote unit 120a by a 2-wire transmit bus 133, causing excitation current to flow through the transducer device in the remote unit 120a, implemented as a Light Emitting Diode (LED) 170. In some embodiments of present invention it might be advantageous to move the drive transistor 136 within the remote units 120, and in that case the connection cable 133 would need to expand from 2 to 3 conductors to provide current return path for the drive circuit. The resulting LED light signal is received at the receiver 110a, converted by the receiving transducer, implemented as a photodiode 180, into a voltage that is conditioned by an application specific IC 181, and coupled to the controller 130 via a 3-wire cable 132, containing power, ground and the conditioned receive signal. The receiver 110a is implemented by photodiode 180, and an application specific IC 181, which provides the level of signal conditioning and miniaturization needed to meet dimensional requirements of the remote unit and noise requirements of industrial installations.

Figure 4A:
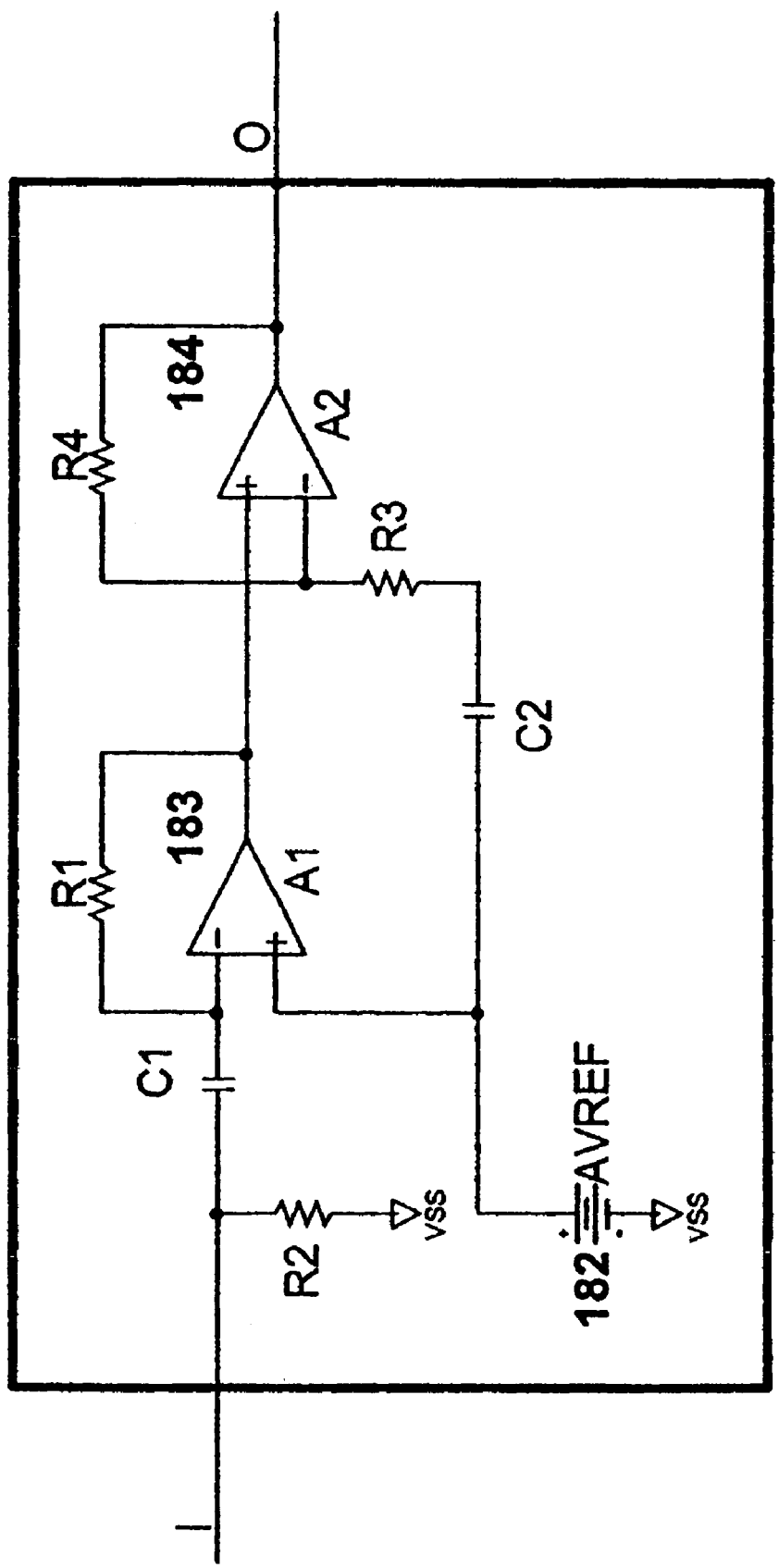
FIGS. 4A-4B are schematics of embodiment of the remote receiver application specific integrated circuit of the present invention.

Referring now to FIG. 4A, an application specific IC 181 contains a voltage reference AVREF for a DC level shift 182, a transconductance amplifier combined with a bandpass filter stage 183, and a voltage gain stage for additional amplification 184. Referring again to FIG. 3, the conditioned signal from the 3-wire cable 132 is routed via a receive multiplexer 137 to an A/D converter 139. The resulting digital signal is evaluated by the microcontroller 141 to determine the status of the channel. The A/D converter 139 under the control of the microcontroller 141 samples the received signal at optimum times as determined by the technology of the transducer and surrounding noise environment.

For example, in photoelectric applications the microcontroller 141 activates the remote receive unit 110 just prior to the remote unit 120 in order to allow the A/D converter 139 to sample the operating noise environment before an excitation signal is produced by the transmitter 120 and received by the receiver 110. If the received signal is below a detection threshold, the microcontroller 141 may resolve that the channel is blocked and communicate such information via the RS232 interface 135 or assert an appropriate output 140 or both. The microcontroller 141 may process single or multiple activation events before concluding a detect or no-detect status of the channel, and such multiple events may be integrated or counted to avoid false detections. The operating sequence is repeated for all sixteen units. Alternatively, a single transmitter 120a can be activated for reception by multiple receivers, for example receivers 110a-d, and the controller 130 selectively actives the receivers to establish a detection profile. More than one transmitter may be activated, sequentially or simultaneously to establish unique detection profiles as desired by the user or dictated by the application.

Figure 5:
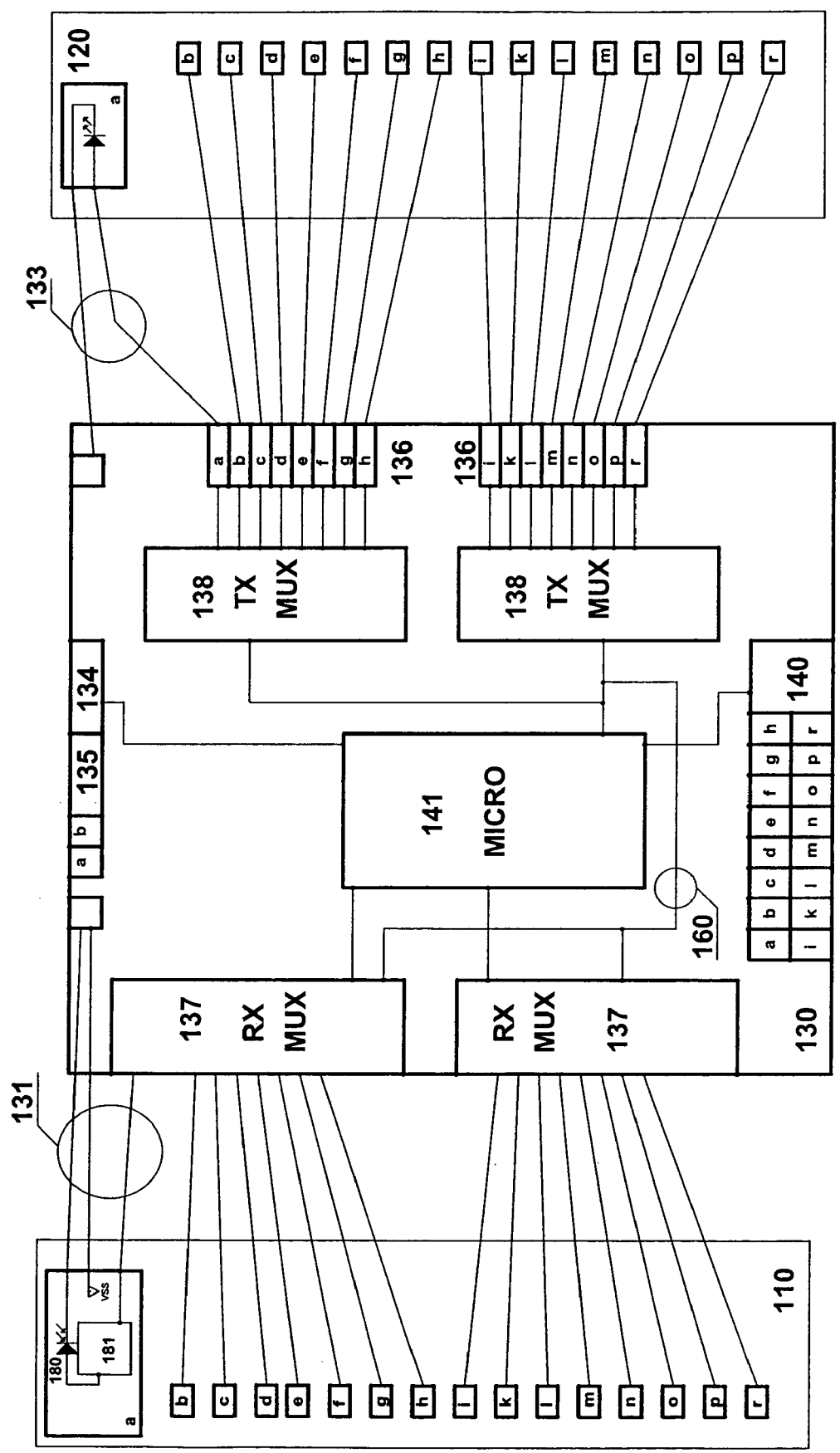
FIG. 5 is a detailed diagram of an alternative embodiment of the flexible scanner and sensor platform of the present invention.
Figure 6:
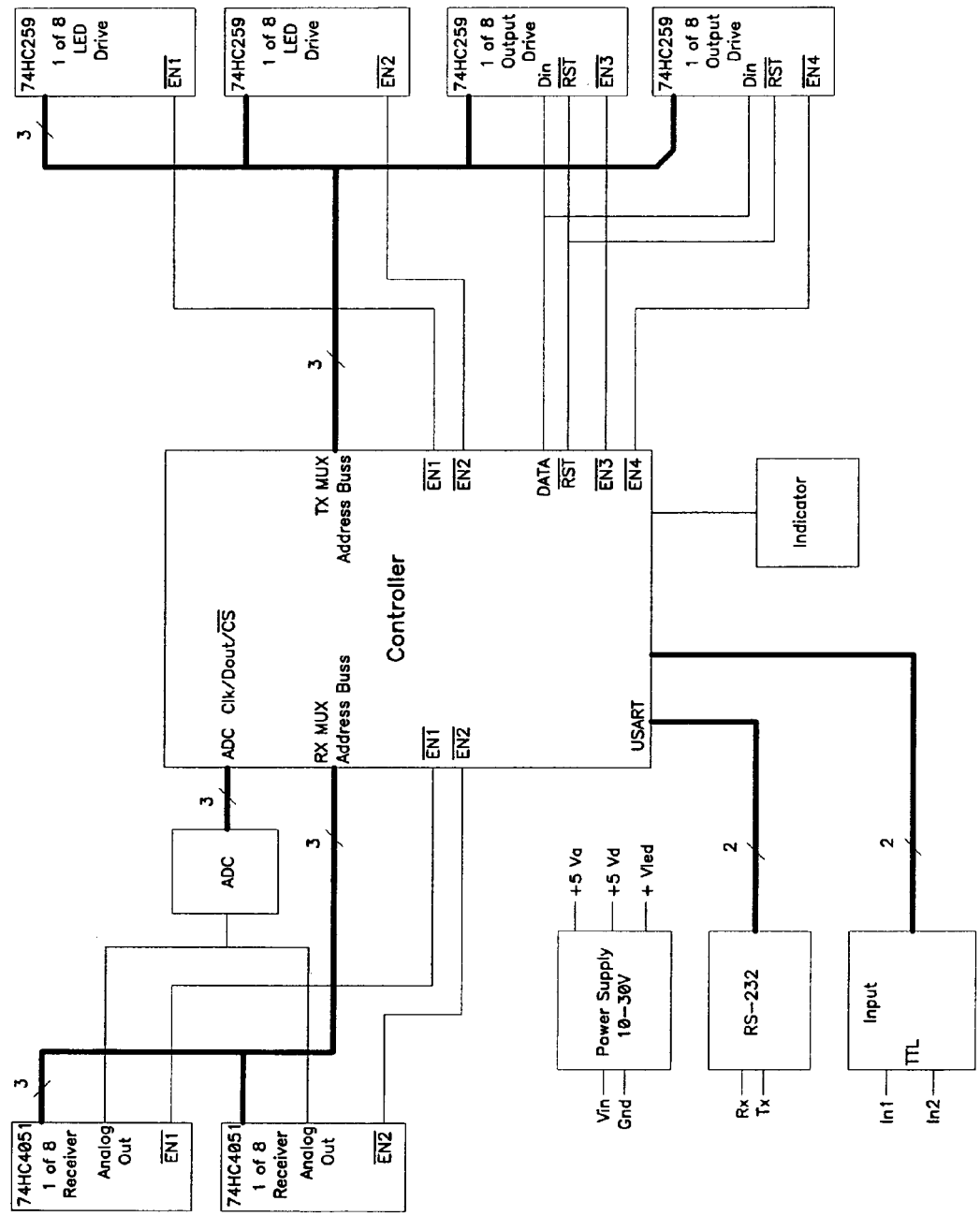
FIG. 6 is detailed top-level schematic of an embodiment of the flexible scanner and sensor platform of the present invention.
Figure 7:
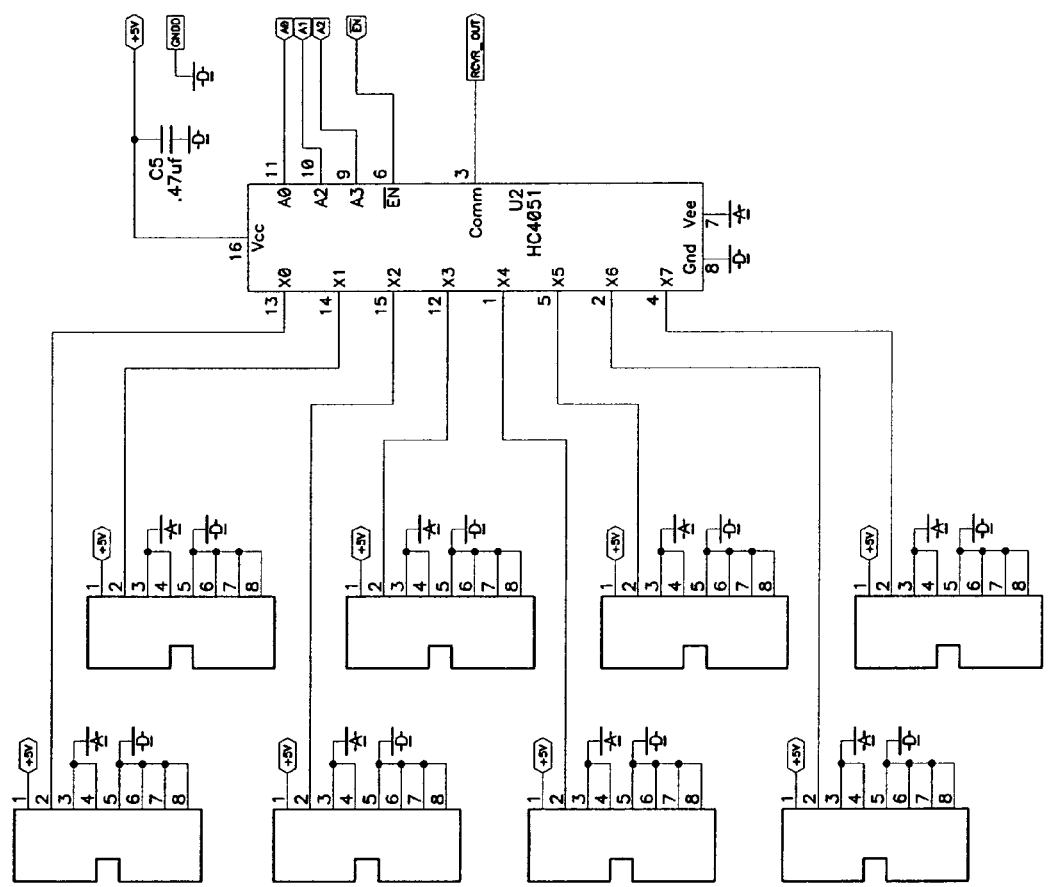
FIG. 7 is detailed schematic of receive multiplexer of an embodiment of the flexible scanner and sensor platform of the present invention.
Figure 8:
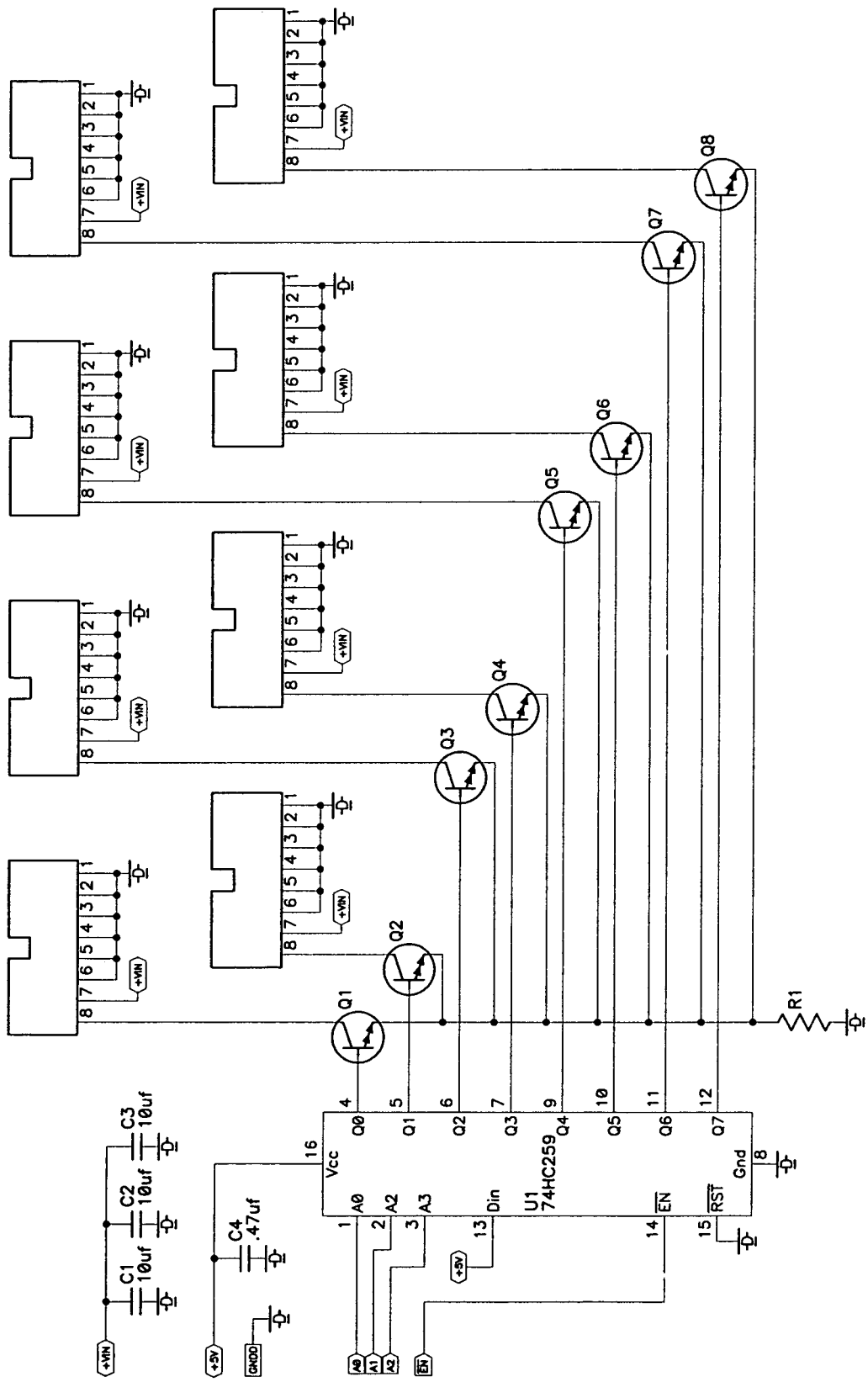
FIG. 8 is detailed top level schematic of transmit multiplexer and driver section of an embodiment of the flexible scanner and sensor platform of the present invention.
Figure 9:
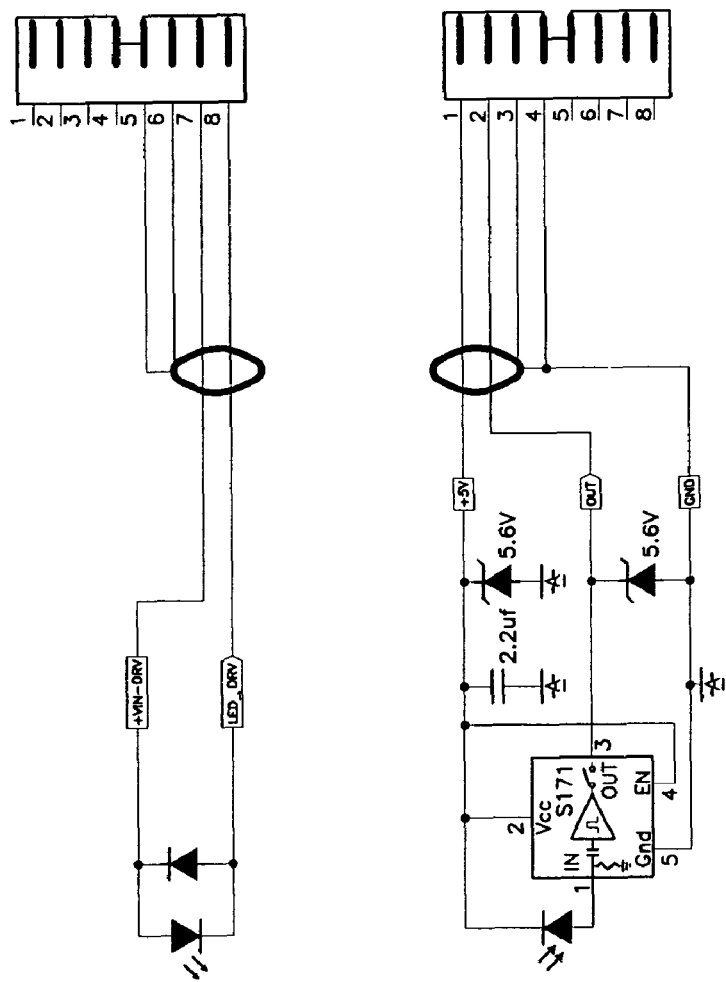
FIG. 9 is detailed schematic of an optical remote receiver unit and optical remote transmitter unit of an embodiment of the flexible scanner and sensor platform of the present invention.
Figure 10:
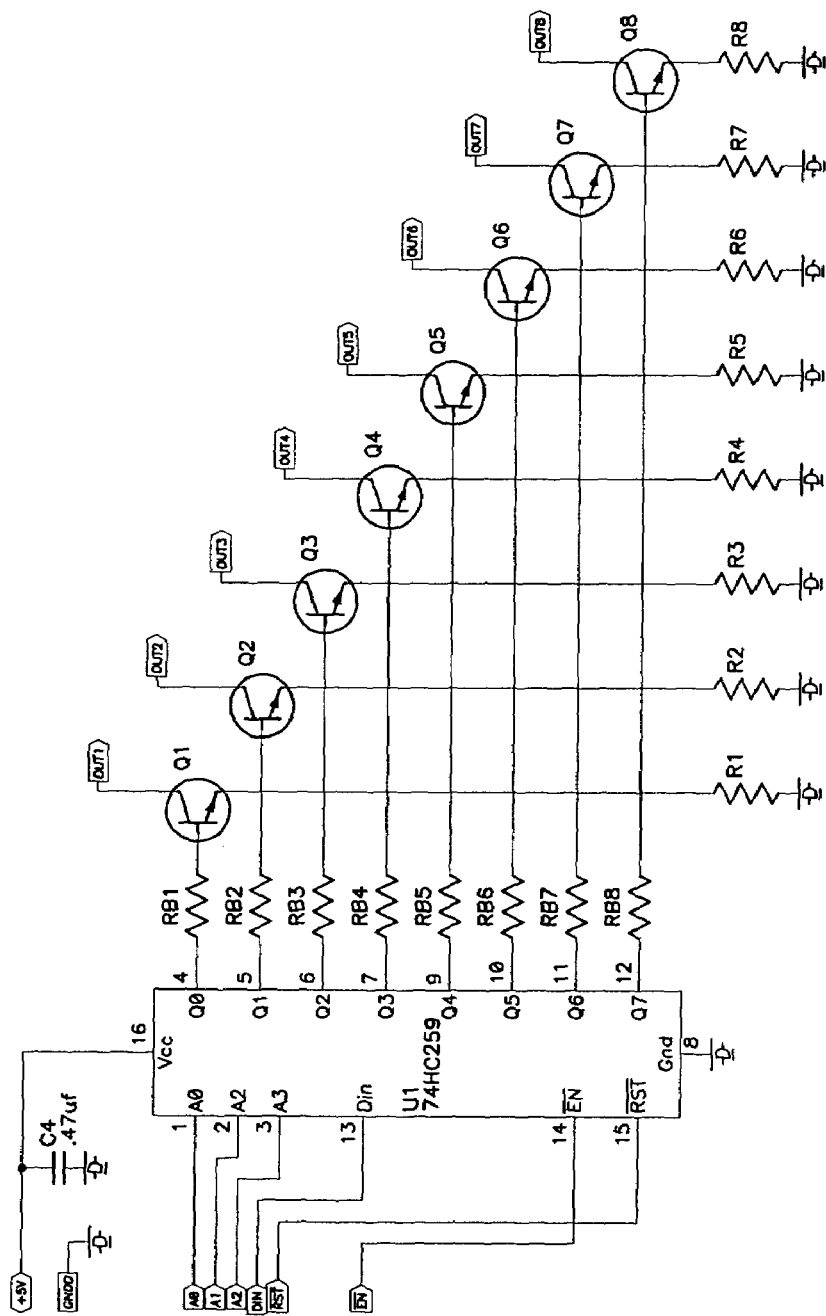
FIG. 10 is detailed schematic of an output multiplexer and driver section of an embodiment of the flexible scanner and sensor platform of the present invention.
Figure 11:
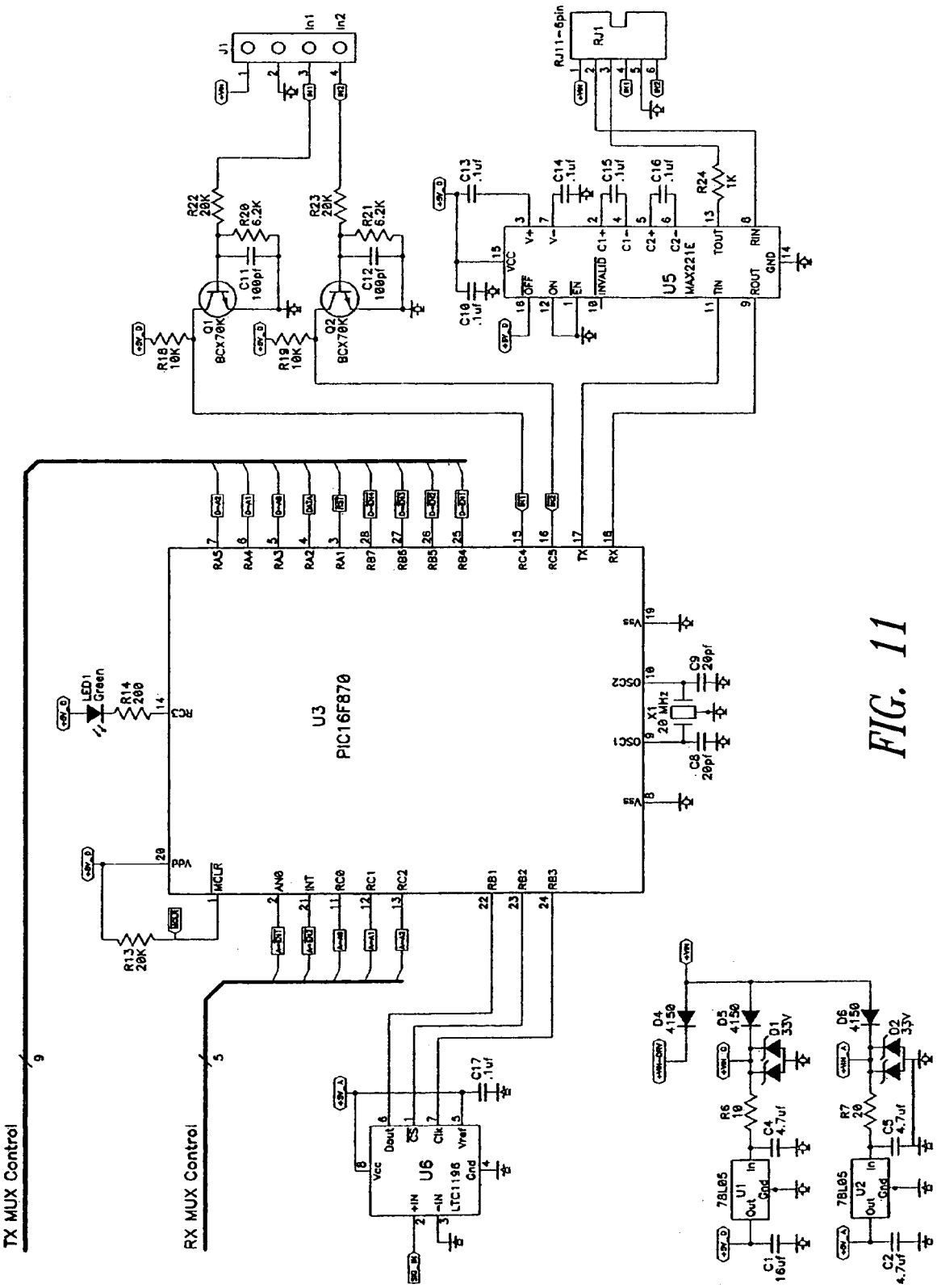
FIG. 11 is detailed top-level schematic of a microcontroller, A/D, power supply and RS232 interface of an embodiment of the flexible scanner and sensor platform of the present invention.

FIGS. 6 through 11 are detailed schematic drawings of the exemplary embodiment of this invention. The sequence of operation is detailed in Table 1 set forth in FIG. 25, and a definition of serial interface is provided in Table 2 set forth in FIG. 24. In another embodiment of this invention, as shown in FIG. 5, the A/D converter 139 can be eliminated if the output of the individual received remote units 110 is provided in the digital form.

Figure 4B:
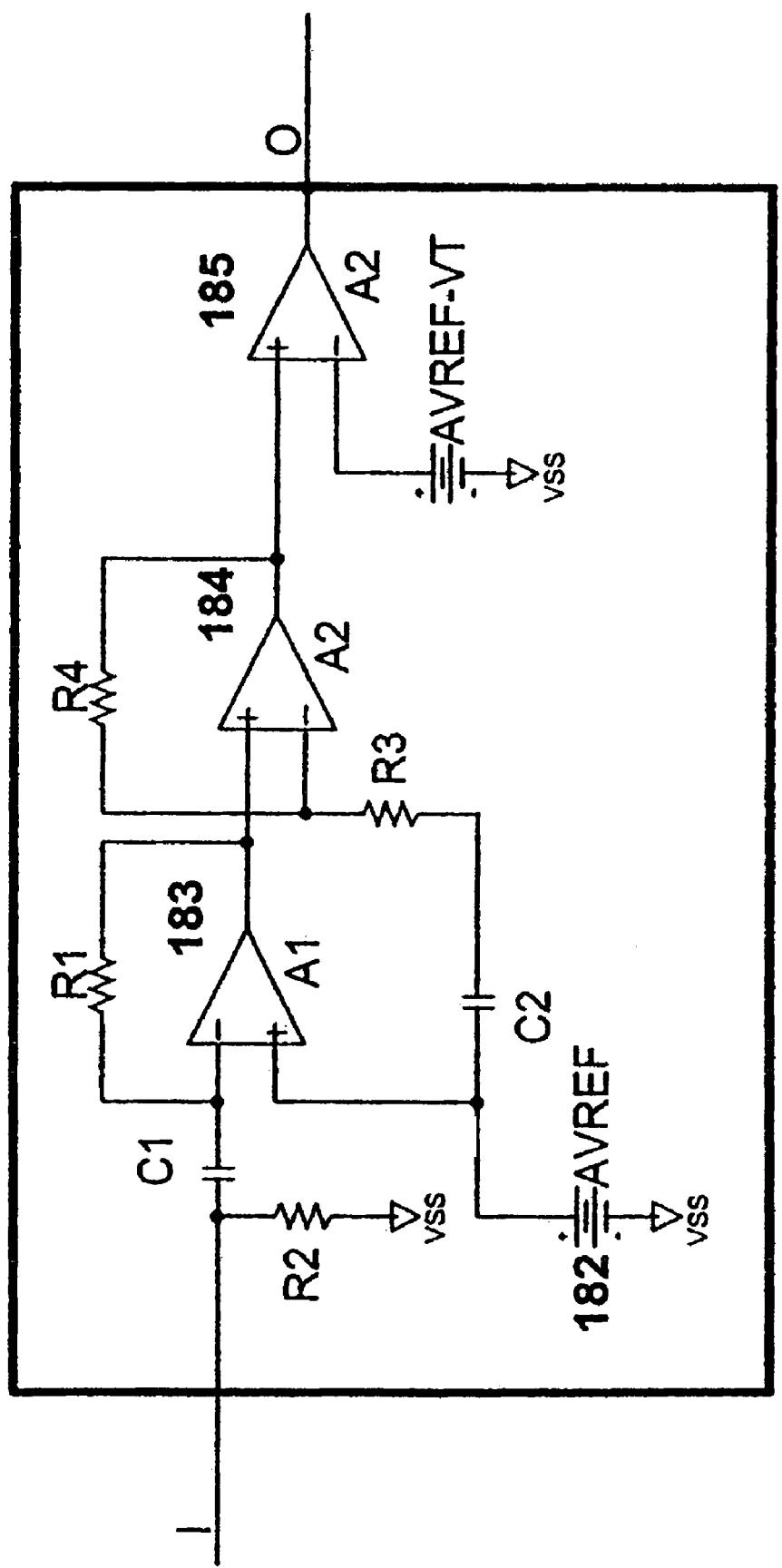

Referring to FIG. 4B, which shows a modified version of an application specific IC 181, a voltage gain stage is followed by a comparator 185, which compares the resulting amplified signal to a known threshold and generates a digital output. The remote receiver units 110 can of course be implemented in a discrete form, utilizing commercially available amplifier ICs and passive components, although such implementation would sacrifice miniaturization and noise immunity aspects of the remote units as presented in this exemplary embodiment.

Figure 12:
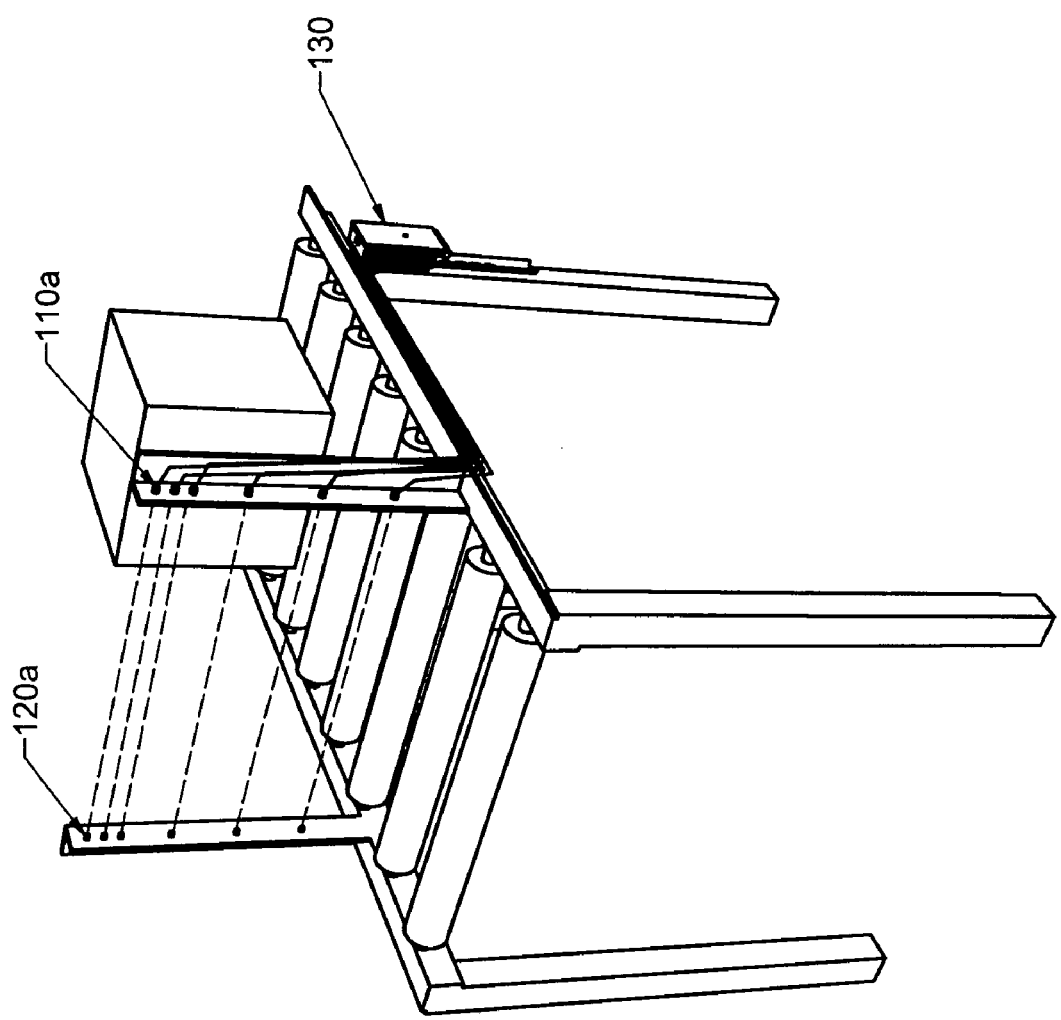
FIG. 12 is an isometric projection of the FLEXI configured as a scanner with adjustable detection height and adjustable resolution.

Referring now to FIG. 12, FLEXI is arranged to form a light curtain scanner with adjustable detection zone height $H_1$ and resolution $R_1$ for remote units 110/120a, b, c and resolution $R_2$ for remote units 110/120c, d, e, f. As illustrated in FIG. 3, an operating sequence is initiated by the microcontroller 141, enabling a single channel on the transmit multiplexer 138, corresponding to drive the transistor 136a, and the remote transmit unit 120a, as well as a single channel on the receive multiplexer 137 corresponding to the remote unit 110a. Absent an object to be detected, the radiated signal produced by the remote unit 120a is received by the remote receive unit 110a, and routed via a selected receive channel of the multiplexer 137 to the A/D converter 139. The resulting digital signal is evaluated by the microcontroller 141 to determine the status of the channel. When the received signal magnitude is above a detection threshold, the detection zone between the receiver unit 110a and the remote unit 120a is considered to be clear. When the received signal magnitude is below a detection threshold, the detection zone between the remote units 110a and 120a is considered to be obstructed. The sequence is repeated for remaining remote units 110/120b, c, d, e.

The response of the controller 130 to an obstruction is program dependent. For example, obstruction of any part of the scanner can result in assertion of a single output 140a.

The outputs can be programmed to indicate not only presence but also the size of the obstruction. For example, the output 140*b* could be asserted for the channel 110/120*e* obstruction, the output 140*c* for obstruction of channels 110/120*d, e*, the output 140*d* for obstruction of channels 110/120*c, d, e* the output 140*e*, for obstruction of channels 110/120*b, c, d, e* and the output 140*f* for obstruction of channels 110/120*a, b, c, d, e*, and the output 140*g* for obstruction of channels 110/120*b, c, d, e, f*. The outputs could, for example, then drive relays, which will route different sized packages to secondary conveyers.

Status of the remote units and outputs can also be made available via a serial interface.

FLEXI's ability to perform non-sequential application specific scanning sequences enables implementation of different detection profiles and resolutions without adjustment to the position of the remote units.

Figure 13:
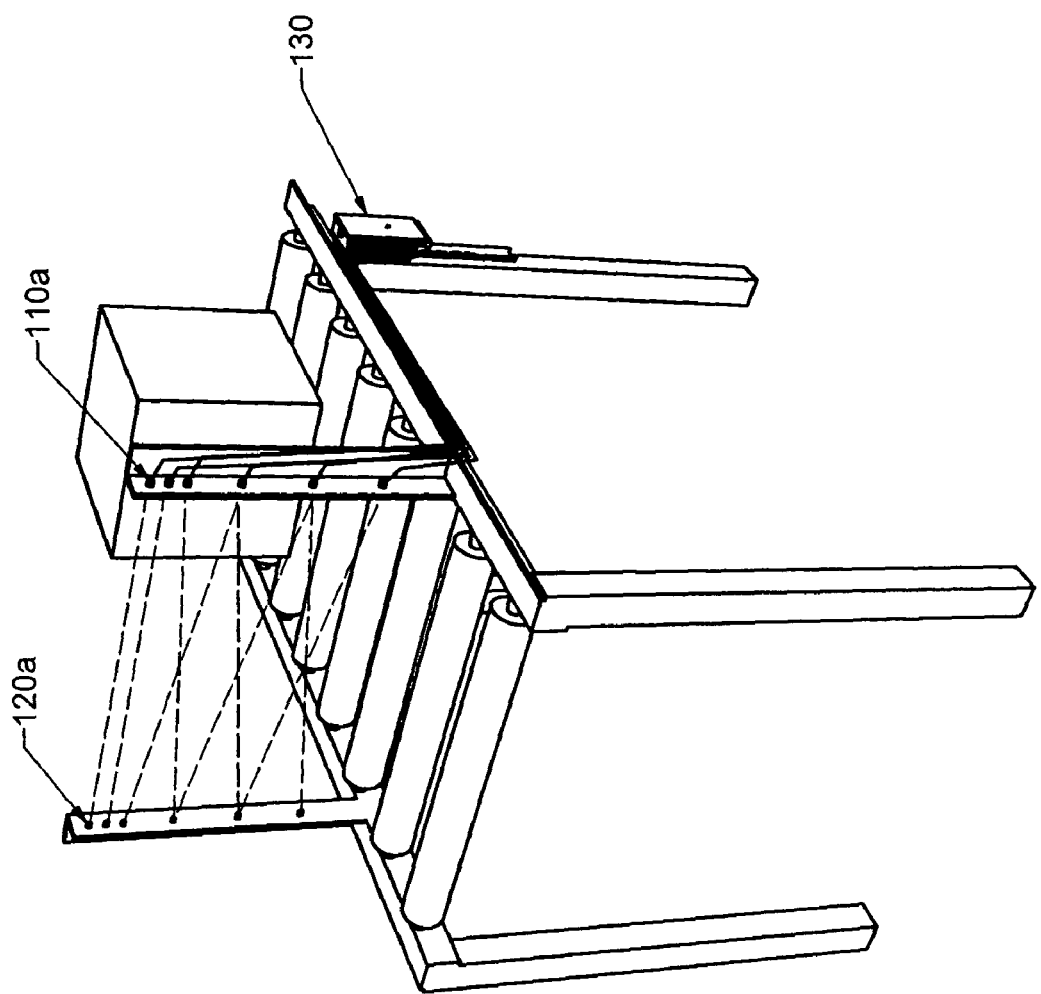
FIG. 13 is an isometric projection of the FLEXI configured as a scanner with custom scanning sequence and resulting crossbeam profile.

Referring now to FIG. 13, the scan sequence of the controller for the remote units 110/120*a*, b has been maintained as shown in FIG. 12, but the scan sequence for remote units 110/120*c, d, e, f* has been changed in such a manner as to effectively increase the resolution in the central area of the detection profile allowing for detection of thin wide objects. The sequence of the scan is as follows:

enable remote transmit unit 120*f* and remote receive unit
enable remote transmit unit 120*e* and remote receive unit 110*f*, followed by 110*d*;
enable remote transmit unit 120*d* and remote receive unit 110*e*, followed by 110*c*;
enable remote transmit unit 120*c* and remote receive unit 110*d*;
enable remote channel 110/120*b*; and
enable remote channel 110/120*a*.

The response of the controller 130 to obstruction is program dependent. For example, obstruction of the cross-beam detection area could result in the output 140*a*; whereas obstruction in all areas could result in the output 140*b*.

Figure 14:
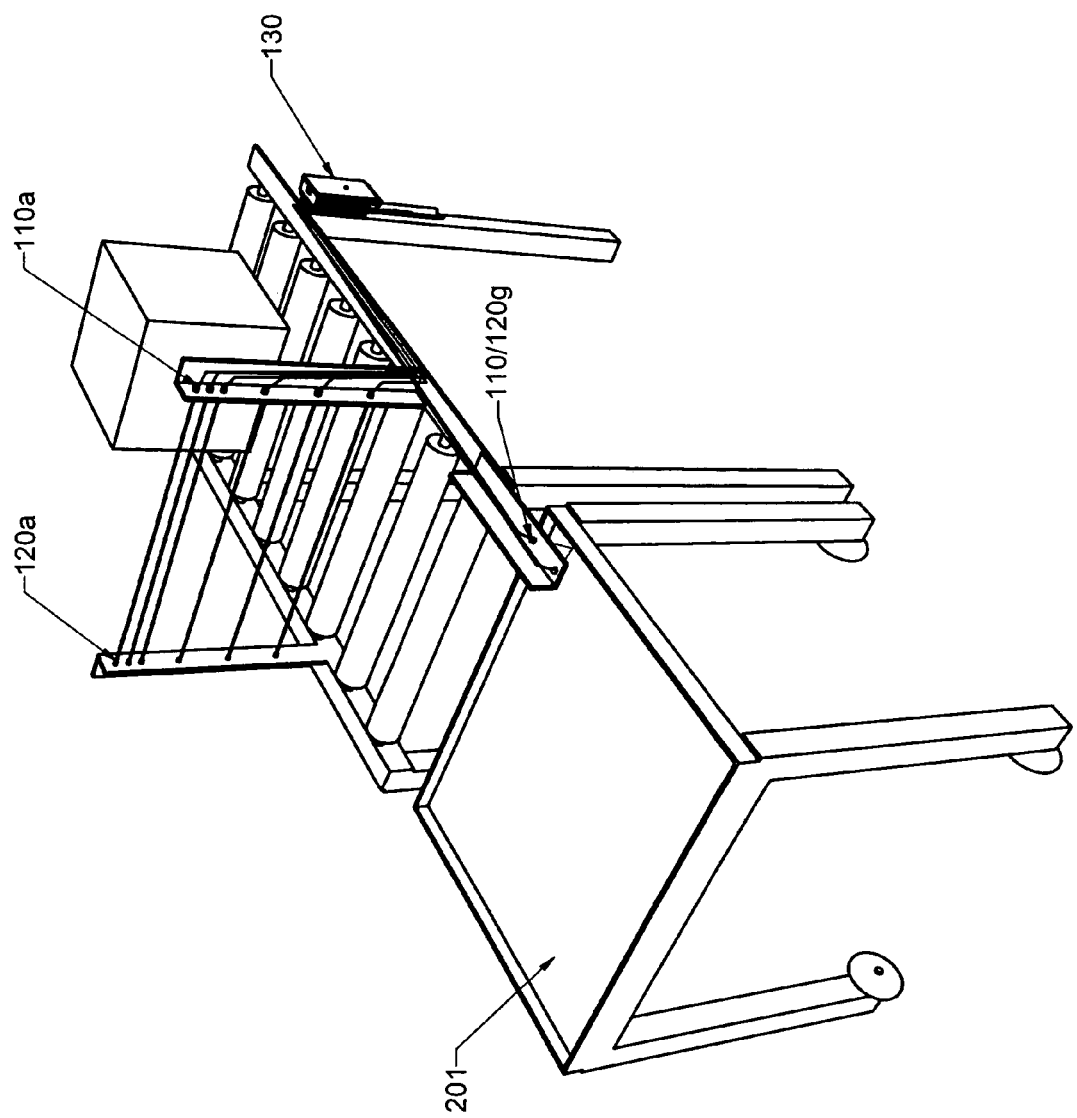
FIG. 14 is an isometric projection of the FLEXI configured as a combination of scanner and sensors.

Referring now to FIG. 14, the remote receiver unit 110*g* and the remote transmitter unit 120*g* are positioned in such a manner as to form an optical proximity sensor, which could for example be responsible for interrupting movement of the conveyer when the cart 201 is removed. Remote units that form the light curtain 110/120*a, b, c, d, e, f* are scanned by the controller 130 in the same manner as indicated in FIG. 12 and described in the respective detailed description. Activation of the remote sensor channel 110/120*g* can be assigned by the programming of the controller 130 to any place in the scanning sequence. For example, the controller 130 can enable remote units 110/120*g* after remote units 110/120*f* and before remote units 110/120*a* are activated. When the cart 201 is present, the emitted LED signal produced by the 120*g* is reflected to the remote unit 110*g* and the resulting signal is routed via a selected receive channel of the multiplexer 137 to an A/D converter 139. The resulting digital signal is evaluated by the microcontroller 141 to determine the status of the channel. When the received signal magnitude is above the detection threshold, the sensing channel 110/120*g* is considered to be obstructed, therefor cart 201 is considered present. When the resulting receive signal magnitude is below the detection threshold, the cart 201 is considered to be absent and the controller 130 could then assert the output 140*h*, which can for example be used to interrupt movement of the conveyer.

Of course, remote receiver and transmitter units can also be located in the same housing to perform proximity or reflex type of sensing. Furthermore although the remote sensor channel 110/120*g* is described in terms of an optical sensor, ultrasound, inductive, capacitive, IR, PIR, RF, etc sensing methods can be employed instead.

The remote sensor channel formed by units 110/120*g* can be scanned by the controller at the same or at a different frequency than remote units 110/120*a, b, c, d, e, f*. Since the movement of the cart is much slower than the movement of the packages on the conveyer, the controller 130 can, for example, be programmed to scan units 110/120*g* every 20 scans, thus maintaining a very fast response time required by the measuring light curtain generated by units 110/120*a, b, c, d, e, f* and yet providing a sufficiently fast response time to the sensor pair 110/120*g* to assure compliant operation. From the perspective of this exemplary application, the FLEXI architecture therefor provides for independent operation of a light curtain and a sensor. Of course, since a multitude of remote units can be integrated, much more complex applications can be addressed with a single FLEXI platform, as is demonstrated on FIG. 15. From the perspective of this application, the light curtain implemented by the units 110/120*a, b, c, d, e, f* and a cart sensor 110/120*g*, and four-sensor conveyer 110/120*h, i, k, l* are independent entities, performing their functions independently of each other. Mutual interference, which is inherent within any sensor systems functioning in proximity of each other is completely avoided by the synchronous nature of FLEXI's operation.

Figure 15:
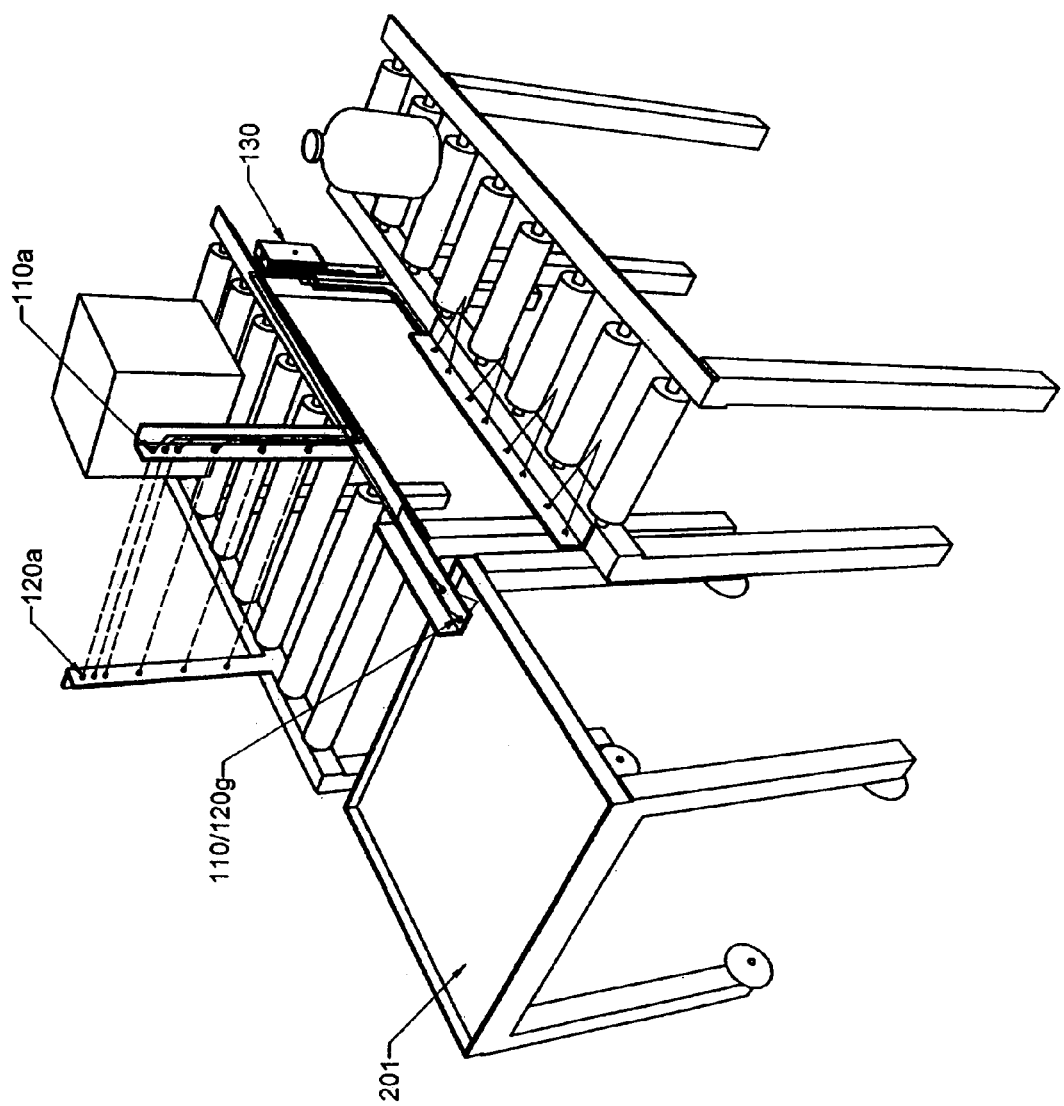
FIG. 15 is an isometric projection of the FLEXI configured as a combination of scanner, stand-alone sensor and configuration of conveyer sensors.
Figure 16D:
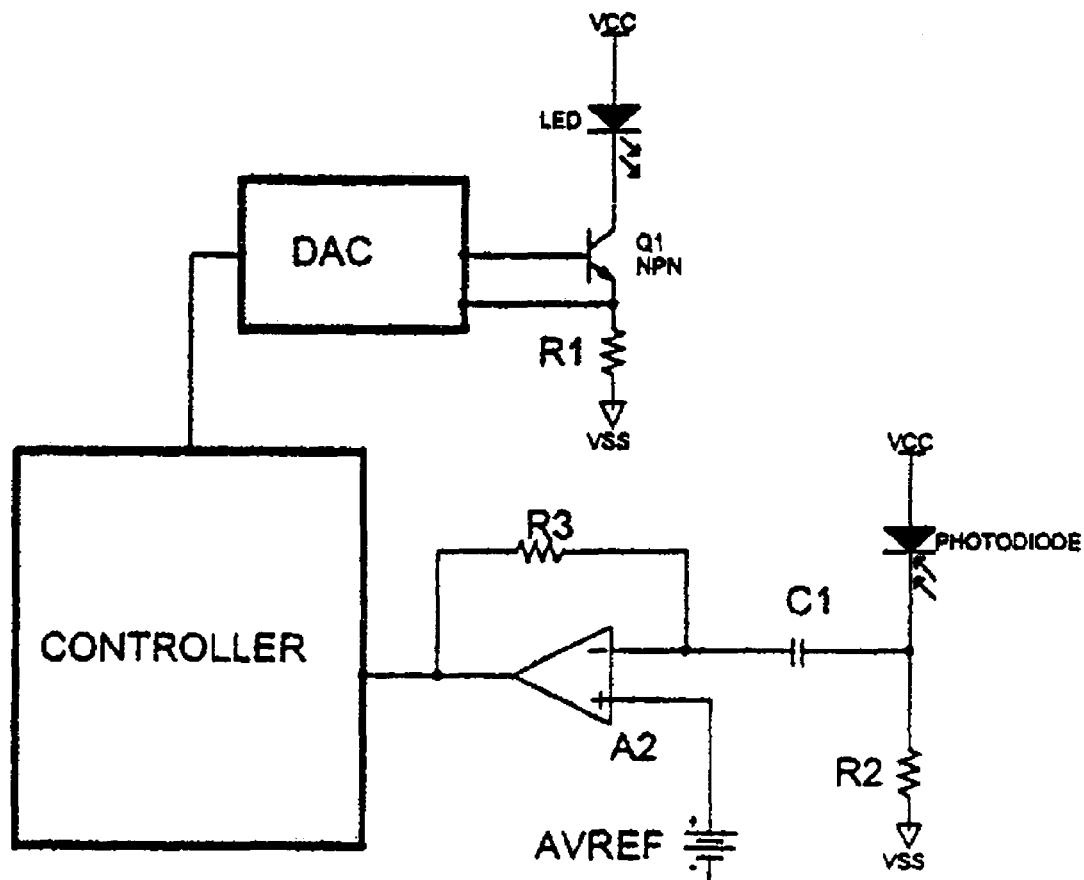
Figure 16C:
Figure 16F:
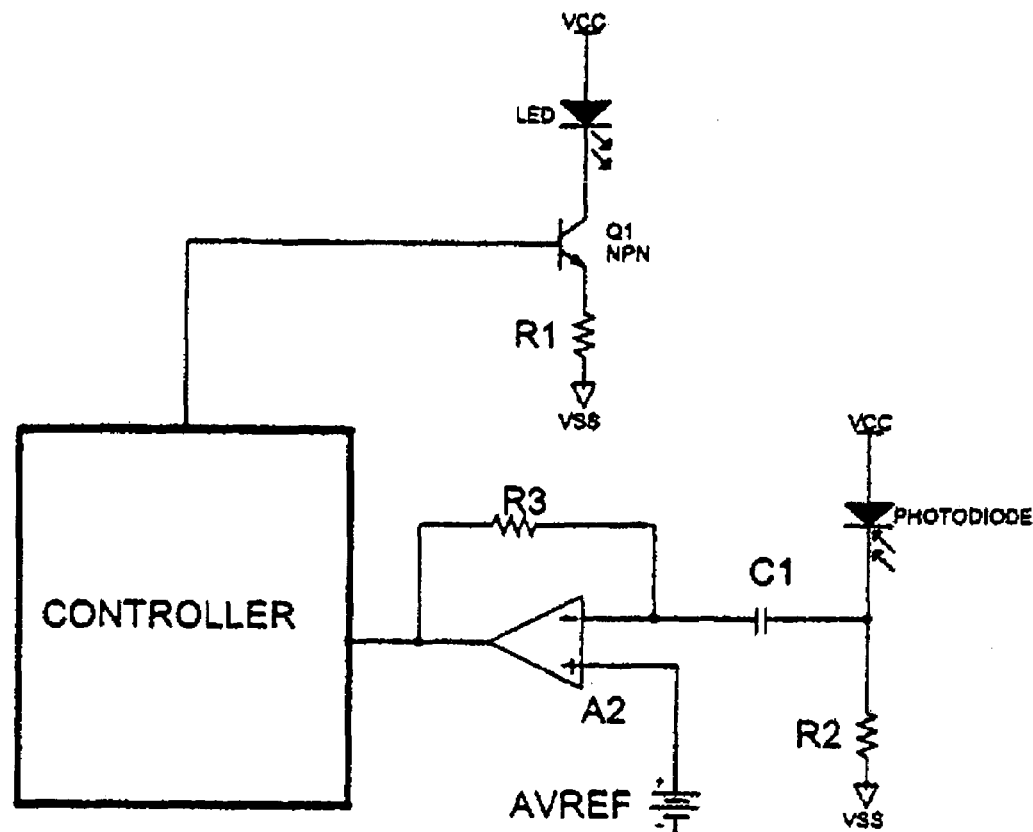
Figure 16E:
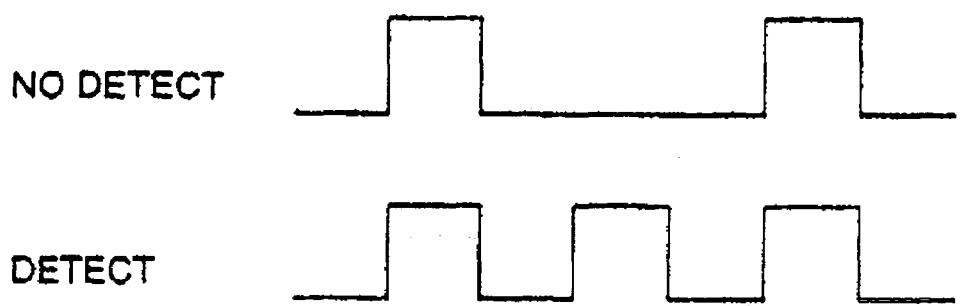
Figure 17A:
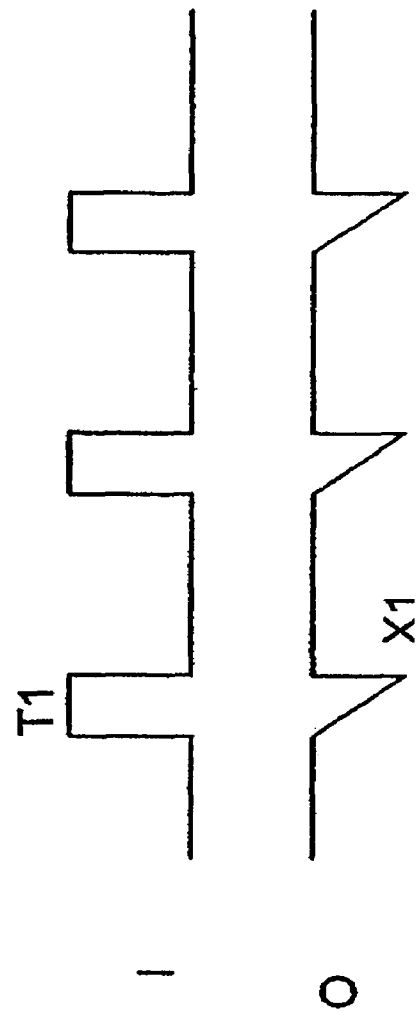
FIGS. 17A-17D are timing diagrams and corresponding schematics of examples of sensitivity control implementation by means of transmit signal adjustment.
Figure 17C:
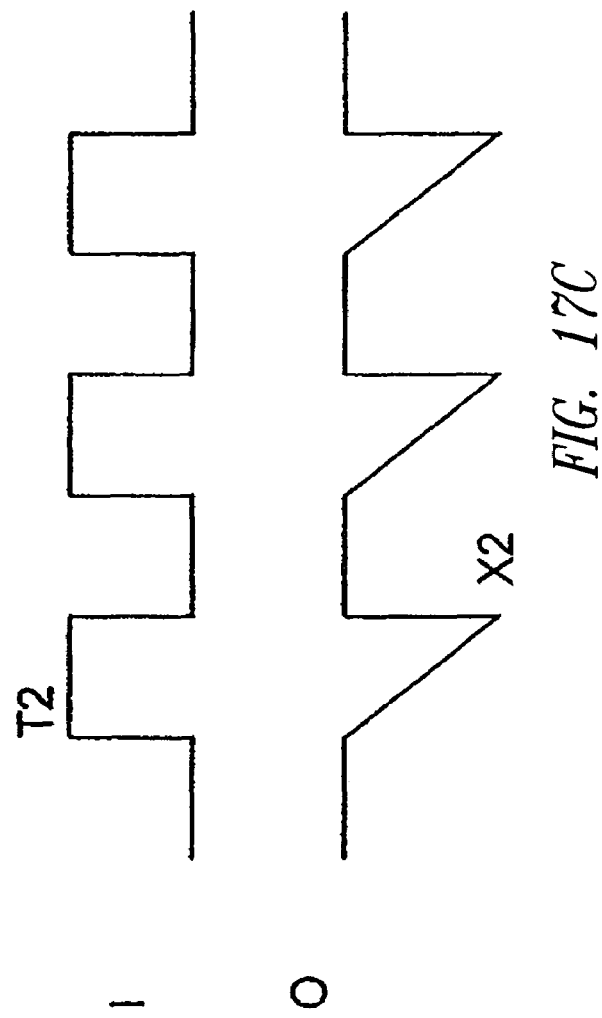
Figure 17B:
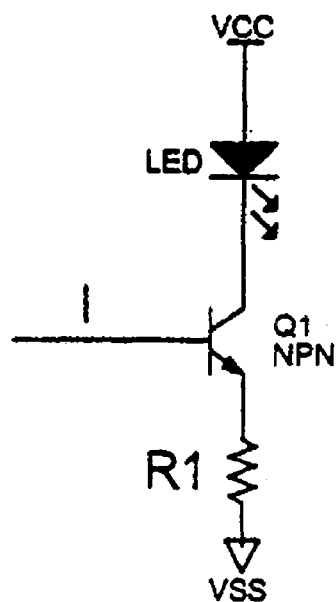
Figure 17D:
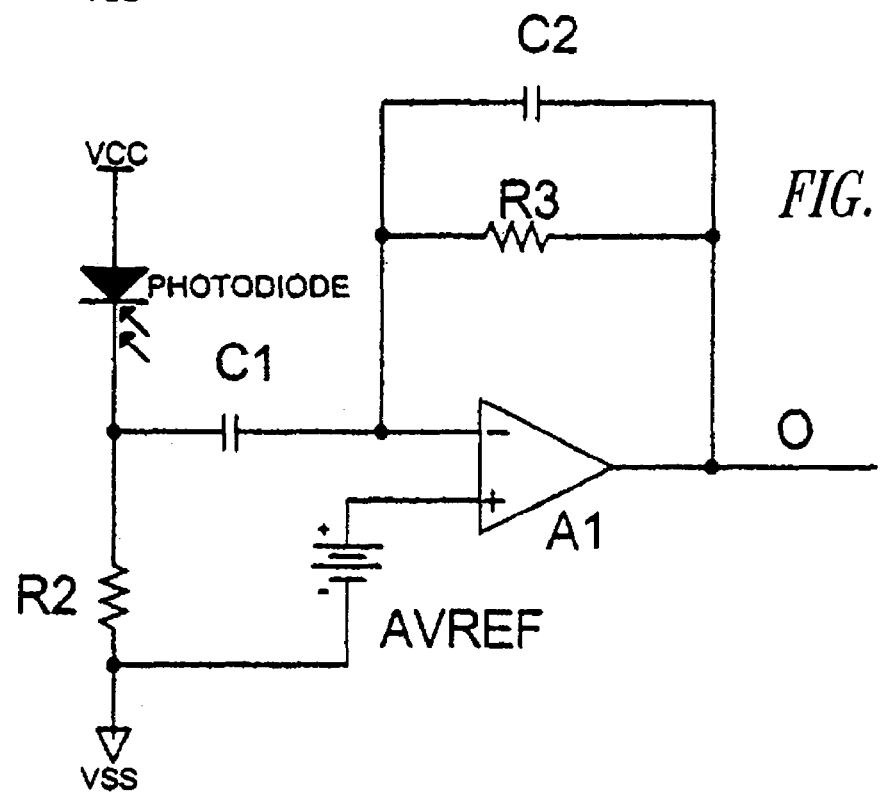

Implementation of the application of FIG. 15 using present devices would require 5 discrete sensors, a light curtain, and a programmable logic controller (PLC). The cost of such a solution would be significantly higher than that offered by the FLEXI. Furthermore, a PLC and light curtain would require a different set of programming tools and instructions. Sensors would have to be positioned sufficiently far away from each other and the light curtain to avoid mutual interference, thus eliminating a large number of potential installations.

Many variations for the use of the present platform are possible, for example. Consider FIGS. 18-22 which briefly demonstrate a way in which Flexible scanner and sensor platform can be deployed.

Figure 18:
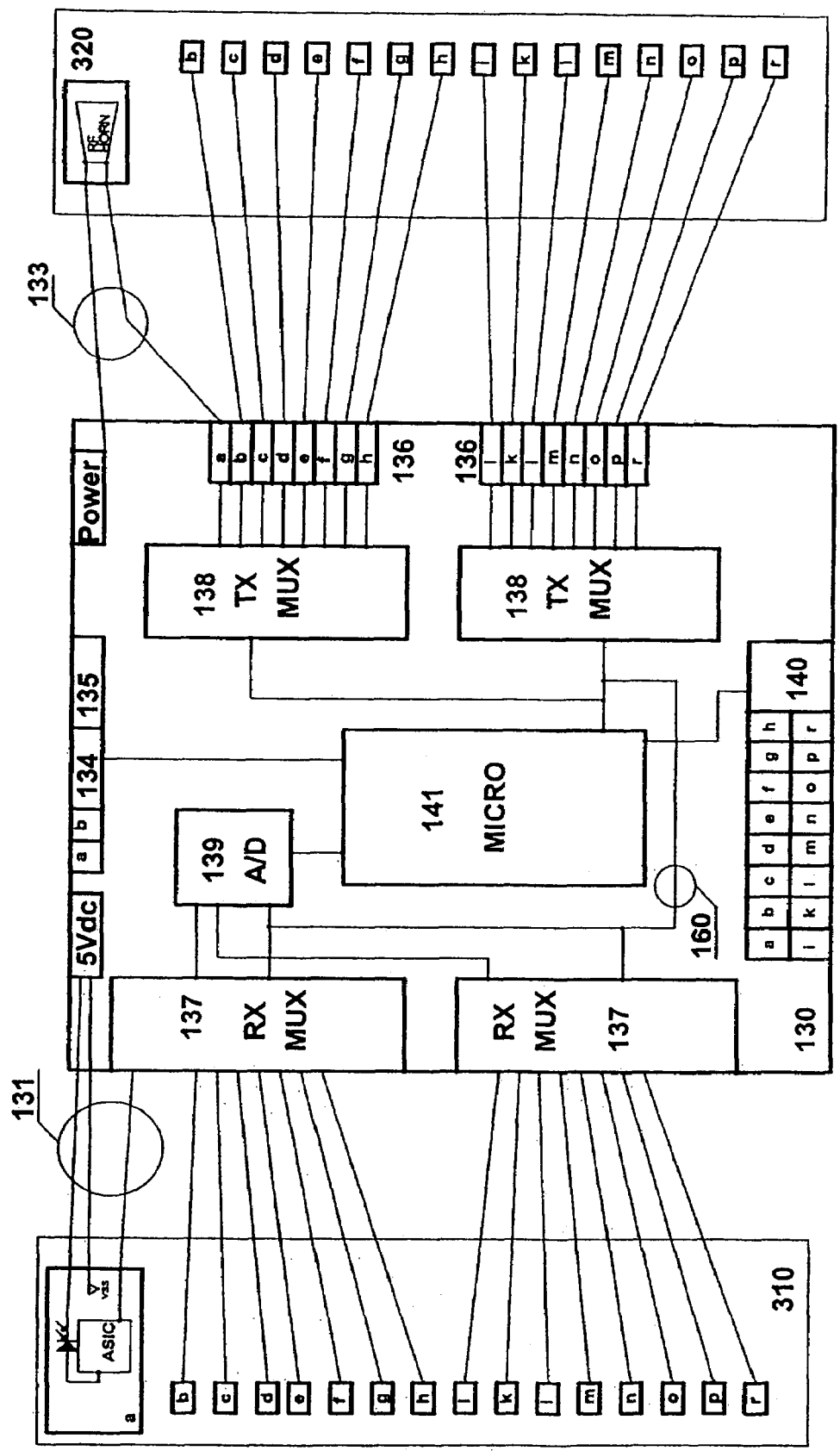
FIG. 18 is an overall block diagram of an embodiment of the flexible scanner and sensor platform of the present invention implementing RF remote units.

FIG. 18 is an overall block diagram of an embodiment of the flexible scanner and sensor platform of the present invention implementing RF remote units. In this embodiment, a RF horn 320 or other antenna is driven at an RF frequency to provide a signal that is picked up by the RF detector 310 and measured under control of the controller 130.

Figure 19:
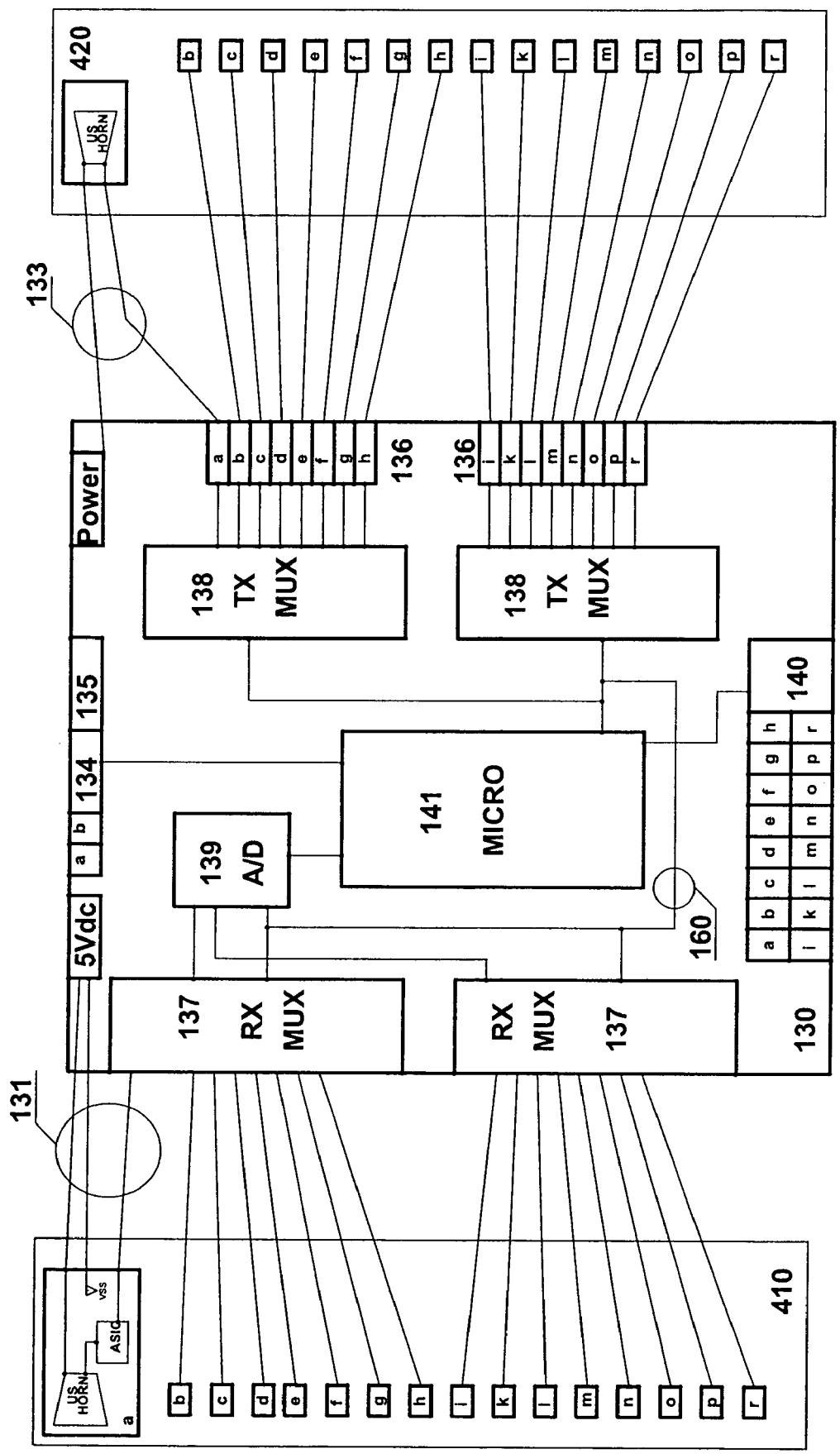
FIG. 19 is an overall block diagram of an embodiment of the flexible scanner and sensor platform of the present invention implementing ultrasonic remote units.

FIG. 19 is an overall block diagram of an embodiment of the flexible scanner and sensor platform of the present invention implementing ultrasonic remote units. In this embodiment, a ultrasonic horn 420 or other transducer is driven by the drive section 136, and ultrasonic signals are received at the horn or other transducer the by remote unit 410 and measured under control of the controller 130.

Figure 20:
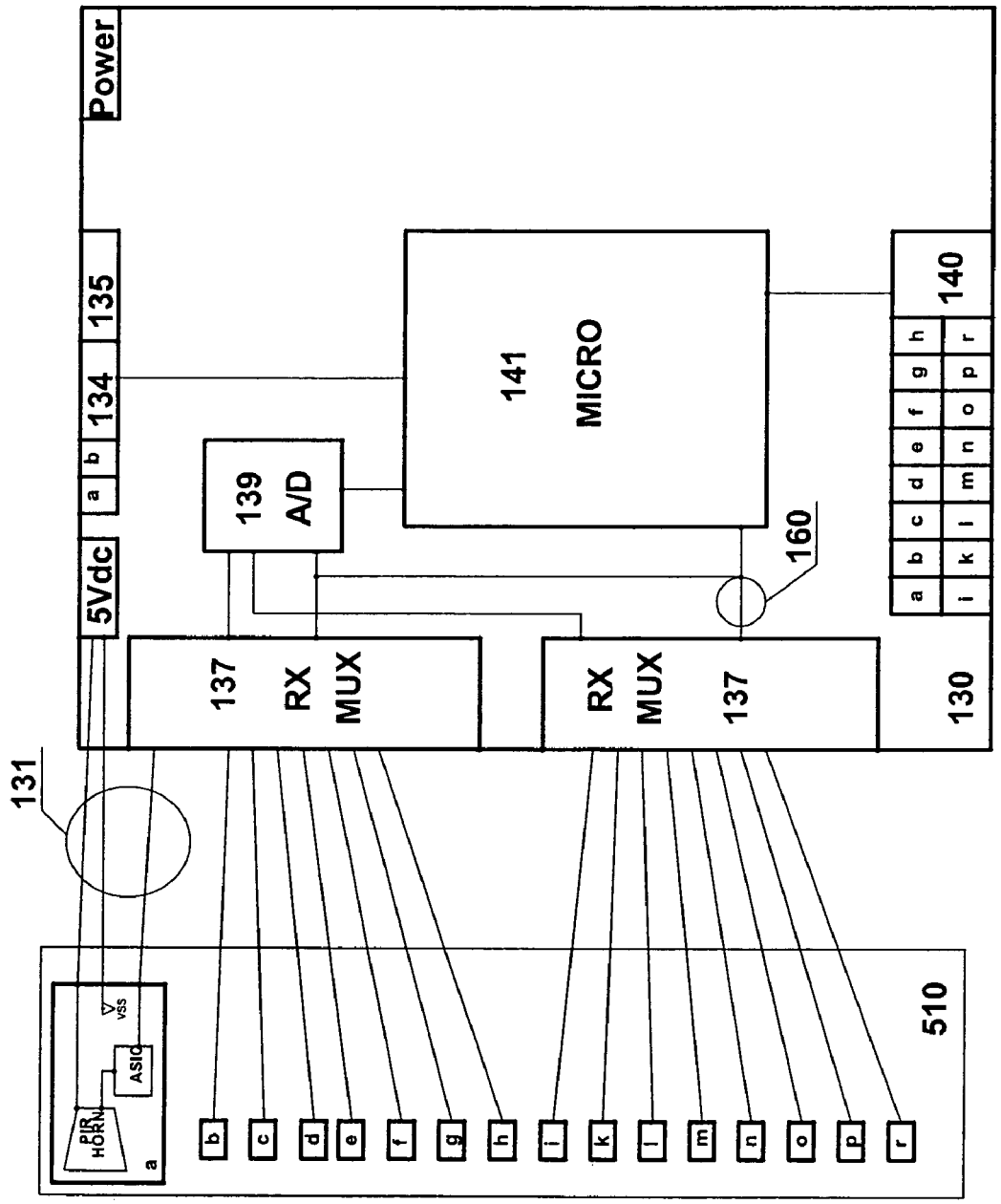
FIG. 20 is an overall block diagram of an embodiment of the flexible scanner and sensor platform of the present invention utilizing PIR remote units.

FIG. 20 is an overall block diagram of the embodiment of an flexible scanner and sensor platform of the present invention implementing PIR remote units. In this embodiment, IR radiation is picked up by the PIR detector 510 and measured under control of the controller 130.

Figure 21:
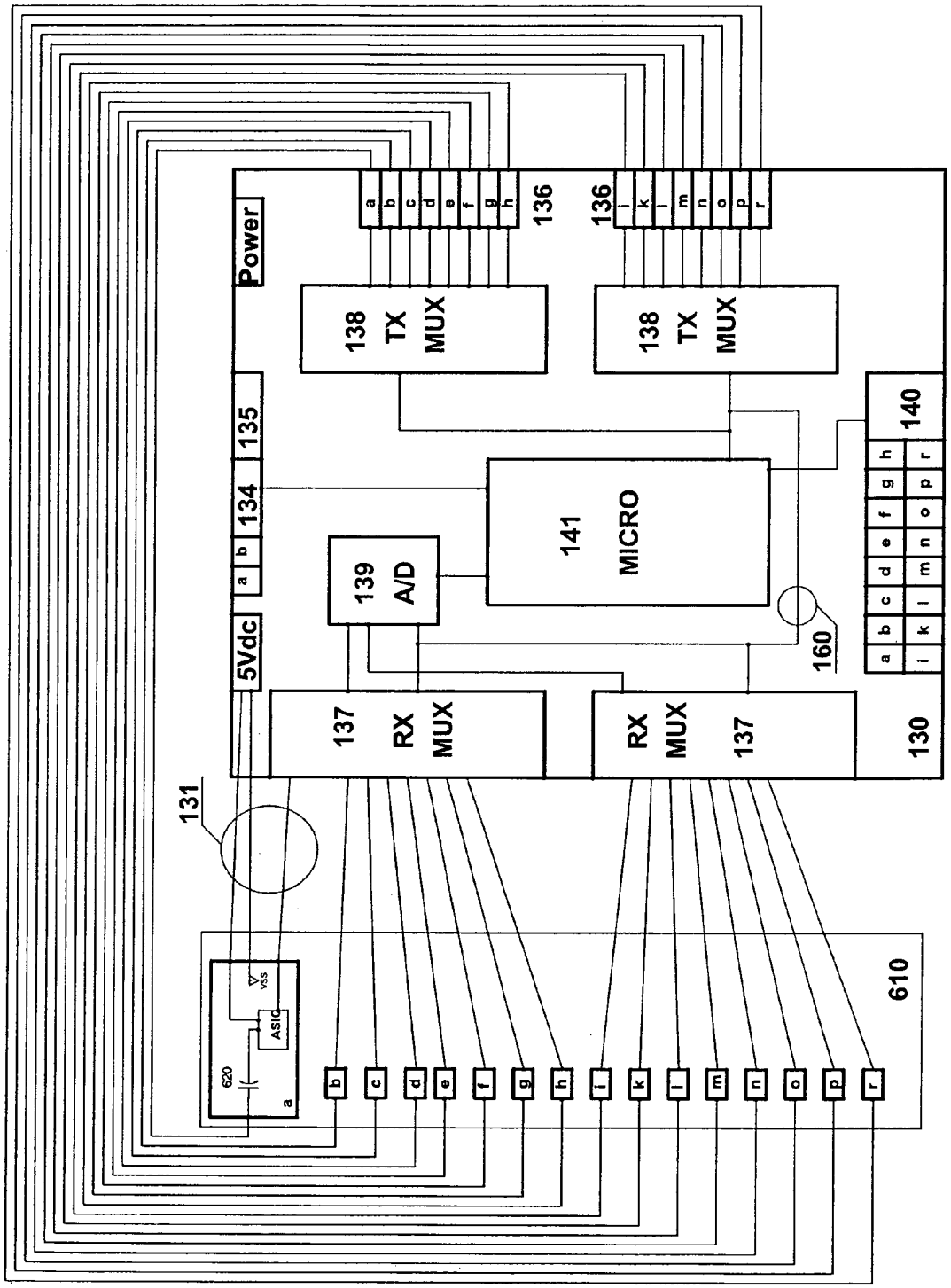
FIG. 21 is an overall block diagram of the embodiment of the flexible scanner and sensor platform of the present invention implementing capacitive remote sensing units.

FIG. 21 is an overall block diagram of an embodiment of the flexible scanner and sensor platform of the present invention implementing a capacitive remote sensing unit. In this embodiment, the capacitor 620 is driven by a drive section 136, while the receiver 610 measures a change in the capacitance under control of the controller 130.

Figure 22:
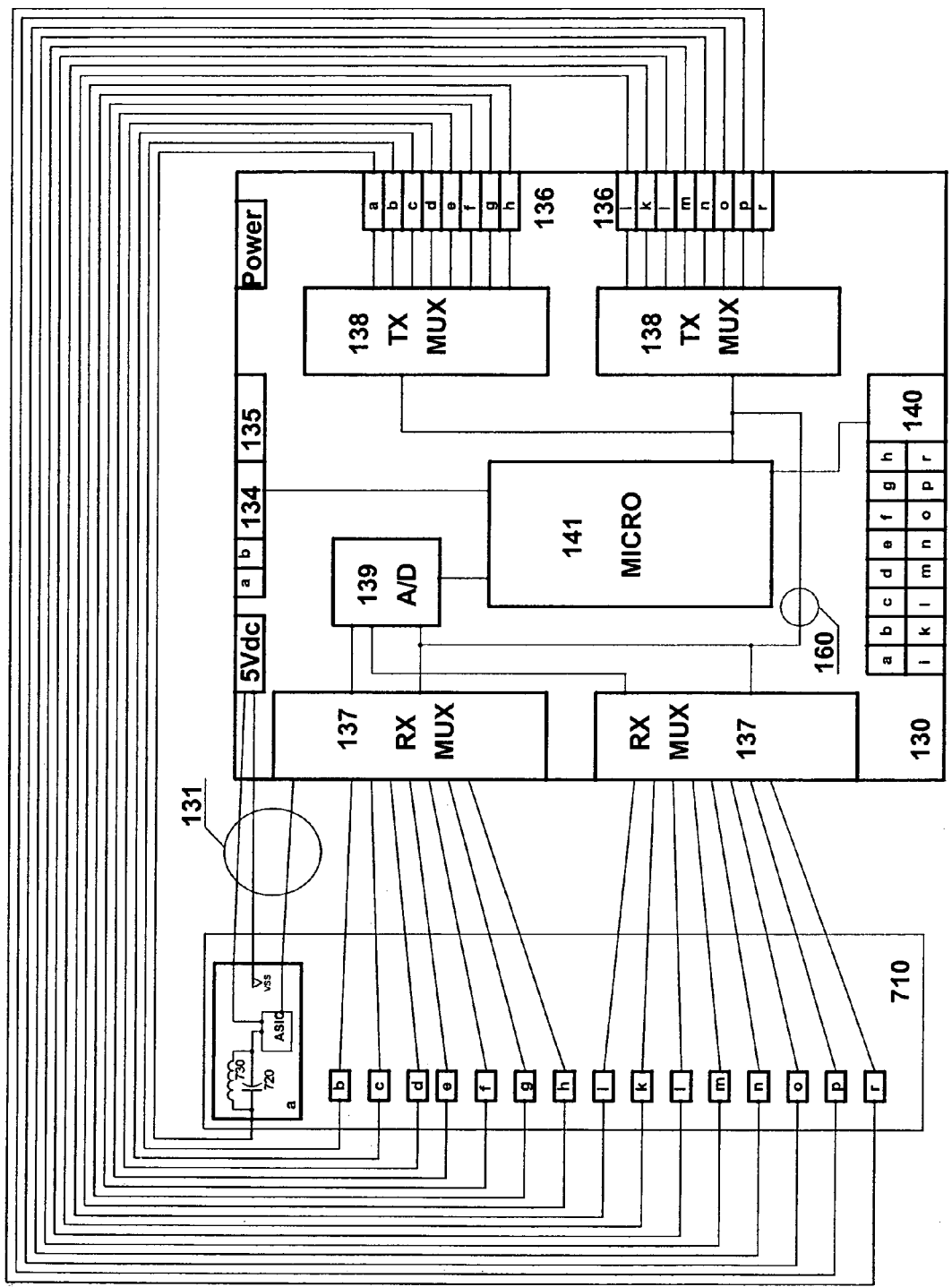
FIG. 22 is an overall block diagram of the embodiment of the flexible scanner and sensor platform of the present invention implementing inductive remote sensing units.

FIG. 22 is an overall block diagram of an embodiment of the flexible scanner and sensor platform of the present invention implementing an inductive remote unit. In this embodiment, the LC tank consists of an inductor 730 and a capacitor 720 and is driven by the drive section 136. The receiver 710 measures the response of the LC tank to the drive signal from the drive section 136. More particularly, the inductor 730 is driven by the drive section 136, while the receiver 710 measures a change in the inductance in response to control signals from the controller 130.

To facilitate direct visual identification of the target location within a beam pattern, the FLEXI scanner and sensor platform integrates a unique approach to target identification that can be extended to standard stand-alone sensors as well as fixed light curtains. In the context of the photoelectric scanner and sensor environment, dedicated LEDs are used to provide a visual indication of an obstructed channel. A method for direct visualization of the target location within a beam pattern will now be described. Referring now to FIG. 3 and FIG. 16, in one embodiment of this invention the controller maintains two different brightness levels for the LED in the remote transmitter unit. The brightness level "Bright" will correspond to the unobstructed status of the channel, and a "Dim" level will correspond to an obstructed status of the channel. In one exemplary embodiment, the pulse width of the LED corresponding to the Bright state can be made wider than the pulse width of the LED corresponding to the Dim state. In another exemplary embodiment, the current passing through the LED in the Bright state can be set higher than the current passing through the LED in the Dim state. In another exemplary embodiment, the period of the LED can be set lower, resulting in higher effective LED current for the Bright state; and the period can be set higher to give a dimmer appearance to indicate Dim state. When remote units are placed adjacent to each other, as in the case of light curtain scanners, the actual location of the target within the LED beam pattern is visible as a shadow, providing an intuitive mechanism for visualizing the location of the object in a two-dimensional as well as a three dimensional detection field.

FIGS. 16A-16F are schematics illustrating examples of implementation and timing for direct visual identification of the target location within a beam pattern.

Referring to FIGS. 17A-17B, and FIGS. 17C-17D, a timing diagram and a schematic of a photoelectric version, respectively, of FLEXI's sensitivity control is demonstrated. System sensitivity control is accomplished by means of a change in the transmitter pulse width and filter characteristic of the receiver. The transmitter pulse width T2 is chosen in such a way as to correspond to the peak magnitude signal level X2 at the receiver output. When the pulse width is reduced to T1, the low pass characteristic of the filter produces signal X1 at the output of the receiver. The pulse width of the transmitter is controlled by the controller and can be varied with great accuracy, providing an effective and novel mechanism for sensitivity and hysteresis control at the receiver, by controlling time domain behavior of the transmitter.

The sensitivity control provided by the combination of the pulse width adjustment and the threshold setting for the A/D output provides FLEXI with dynamic range necessary to perform not only digital detect or no-detect measurements, but also relative analog measurements required by applications where the contrast between detect and no-detect is so low that absolute measurement is not possible, such as in the case of transparent material detection.

While the invention has been described in conjunction with specific embodiments, it is evident that many alternatives, modifications, permutations and variations will be apparent to those skilled in the art in light of the foregoing description. Accordingly, it is intended that the present invention embrace all such alternatives, modifications and variations as fall within the scope of the appended claims and the equivalents thereof.

What is claimed is:

1. A detection apparatus, comprising:
   a plurality of sensing units that are remote to each other;
   a single controller remote to the plurality of sensing units, the controller configured to both simultaneously activate a first set of remote sensing units in accordance with a selected frequency of activation and selectively activate at least a second set of remote sensing units in accordance with a selected activation sequence and a different selected frequency of activation than the first set of remote sensing units; and
   means for coupling the controller to each remote sensing unit and adapted to enable positioning of the remote sensing units in user-determined configurations.

2. The apparatus of claim 1, wherein each remote sensing unit comprises a remote unit pair formed of a remote transmitting unit and a remote sensor unit.

3. The apparatus of claim 1, wherein the selected activation sequence is stored in a memory and the first and second selected sequences are determined in advance by a user.

4. The apparatus of claim 1, wherein the plurality of remote sensing units are mounted in different location that define at least one detection profile.

5. The apparatus of claim 1, wherein the first set of remote sensing units defines a first detection profile and the selected activation sequence of the second set of remote sensing units defines a second detection profile.

6. A scanning and control system, comprising:
   a plurality of remote sensing units, each sensing unit configured to transmit and detect an emitted signal;
   a single controller coupled to the plurality of remote sensing units by a coupling device that is configured to enable selective positioning and selective activation sequences of each remote sensing unit, the controller configured to repeatedly activate a first plurality of remote sensing units simultaneously in accordance with a first activation sequence, and to repeatedly activate a second plurality of remote sensing units in accordance with a second activation sequence that is different from the first activation sequence, to receive a detection signal from each remote sensing unit, and to generate an output in response thereto; and
   a controlled device coupled to the controller and configured to be controlled in response to the output from the controller.

7. The system of claim 6, wherein each remote sensing unit comprises a remote unit pair formed of a remote transmitting unit and a remote sensor unit.

8. The system of claim 6, wherein the first and second activation sequences are stored in a memory and are determined in advance by a user.

9. The system of claim 6, wherein the first plurality of remote sensing units are mounted in different locations that define a first single detection profile and the second plurality of remote sensing units are mounted in different locations to define a second detection profile that is different from the first detection profile.

10. The system of claim 6, wherein the activation sequence of the first plurality of remote sensing units defines a single detection profile.

11. The system of claim 6, wherein the controller is configured to repeatedly scan the first plurality of remote sensing units at a first scanning frequency.

12. The system of claim 11, wherein the controller is configured to scan at least one remote sensing unit from the second plurality of remote sensing units at a different frequency than the scanning frequency of at least one other remote sensing unit in the second plurality of remote sensing units.

13. A detection system, comprising:
a plurality of sensing units located remote from each other;
a single controller coupled to the plurality of remote sensing units, the controller configured to activate a first group of the plurality of remote sensing units in a simultaneous mode while at the same time activating a second group of the plurality of remote sensing units in a predetermined activation sequence mode; and
a coupling mechanism configured to couple each the plurality of remote sensing units to the single controller and to permit selective positioning of each remote sensing unit.

14. The system of claim 13, wherein each remote sensing unit comprises a remote unit pair formed of a remote transmitting unit and a remote sensor unit.

15. The system of claim 13, wherein the controller is configured to receive an output from each remote sensing unit and process the output in multiple modes.

16. The system of claim 15, wherein the multiple modes comprise a sensing mode and a scanning mode.

17. The system of claim 13, wherein the first group of remote sensing units are mounted in different locations that define at least one detection profile.

18. The system of claim 13, wherein the predetermined activation sequence of the second group of remote sensing units defines a single detection profile.

19. The system of claim 13, wherein the controller is configured to repeatedly activate the first group of remote sensing units at a predetermined frequency.

20. The system of claim 13, wherein the controller is configured to activate at least one remote sensing unit in the second group of remote sensing units at a different frequency than an activation frequency of at least one other remote sensing unit in the second group of remote sensing units.

21. The system of claim 13, wherein the remote sensing units each comprise a transmitter unit and a receiver unit, and the transmitter unit comprises multiple light emitting diodes, and wherein the controller is configured to adjust e brightness of the light emitting diodes in the presence of a target to provide a visual indication to a user.

22. The system of claim 13, wherein the remote sensing units comprise at least one remote sensing unit configured to utilize a first sensing method and at least one other remote sensing unit configured to utilize e a second sensing method different from the first sensing method, the first and second sensing methods comprising, respectively, one from among optical, ultrasonic, radio frequent identification, inductive, infrared, and mechanical sensing methods.

23. The system of claim 13, wherein the controller is configured to modulate at least one remote sensing unit in the second group of remote sensing units at a different frequency than a modulation frequency of at least one other remote sensing unit in the second group of remote sensing units.

24. The system of claim 13, wherein the predetermined activation sequence of the second group of remote sensing units defines multiple detection profiles.

25. The system of claim 13, wherein the predetermined activation sequence of the second group of remote sensing units defines a resolution of a single detection profile.

26. The system of claim 13, wherein the predetermined activation sequence of the second group of remote sensing units defines a resolution of multiple detection profiles.

27. The system of claim 13, wherein the second group of remote sensing units are mounted in different locations that define a resolution of a single detection profile.

28. The system of claim 13, wherein the second group of remote sensing units are mounted in different locations that define resolutions of multiple detection profiles.

29. The system of claim 13, wherein each remote sensing unit comprises a signal conditioning circuit configured to filter and amplify the input signal of a transducer to produce an amplified signal.

30. The system of claim 29, wherein the controller comprises a microprocessor and an interface circuit for routing the amplified signals to an A/D converter in response to commands from the microprocessor, the A/D converter configured to convert the amplified signal to a digital signal in response to commands from the microprocessor, an interface circuit that provides a signal drive to the transducer in response to commands from microprocessor, an output circuit for producing an output signal in response to commands from the microprocessor, and an input circuit for receiving programming operating parameters of the microprocessor.

31. The system of claim 29, wherein each remote sensing unit comprises a signal conditioning circuit configured to filter, amplify, and demodulate a signal from the transducer to produce a digital signal.

32. The system of claim 31, wherein the controller comprises a microprocessor and an interface circuit for routing one of the digital signals to the microprocessor in response to a command from microprocessor, an interface circuit that routes a signal from an output circuit for producing an output signal in response to commands from the microprocessor, and an input circuit for receiving programming operating parameters of the microprocessor.

33. A method of detection, comprising:
providing multiple sensing units that are housed remote from each other, each sensing unit configured to transmit and detect an emitted signal;
providing a controller coupled to the multiple remote sensing units and configuring the controller to independently control each remote sensing unit in accordance with multiple modalities, including simultaneous activation of a first group of the remote sensing units and at the same time activation of a second group of the remote sensing units in accordance with a selective activation sequence, and to process outputs independently from each of the remote sensing units; and
providing a coupling mechanism to couple the controller to each remote sensing unit in a manner that permits selective positioning and selective response times of each remote sensing unit.

34. The method of claim 33, wherein providing the controller comprises configuring the controller to adjust sensitivity of the remote sensing units by adjusting a transmitted signal.

35. The method of claim 33, wherein providing multiple remote sensing units comprises providing at least one remove sensing unit configured to utilize a first sensing method and at least one other remote sensing unit configured to utilize a second sensing method different from the first sensing method, the first and second sensing methods comprising, respectively, one from among optical, ultrasonic, radio frequency identification, capacitive, inductive, infrared, and mechanical sensing methods.

36. The method of claim 35, wherein providing the controller comprises configuring the controller to provide a visual indication to a user by adjusting brightness of light transmitted by at least one of the remote sensing units.

37. The method of claim 33, wherein each of the remote sensing units comprises at least one transmitter unit and a plurality of receiver units configured to receive a signal from the at least one transmitter unit, and the controller is configured to activate the at least one transmitter unit and simultaneously activate the receiver units in accordance with a predetermined activation pattern to define a detection profile.

38. The method of claim 33, wherein providing the controller comprises configuring the controller to provide a visual indication to a user by adjusting brightness of light transmitted by the remote sensing units.

39. A detection system, comprising:
a plurality of remote sensing units; and
a single controller coupled to the plurality of remote sensing units, the controller configured to selectively activate a first group of the remote sensing units in a simultaneous mode and a second group of other remote sensing units in a predetermined activation sequence mode for activating each of the second group of remote sensing units in series with the other remote sensing units in the second group of remote sensing units, the controller configured to receive an output from each of the plurality of remote sensing units and process the outputs in multiple modes.

40. The detection system of claim 39, wherein the multiple modes comprise a sensing mode and a scanning mode.

41. A detection system, comprising:
a plurality of sensing units located remote from each other; and
a single controller remote from and coupled to the plurality of remote sensing units, the controller configured to selectively activate each remote sensing unit in one from among a simultaneous mode, wherein selected remote sensing units activated simultaneously with each other, a predetermined activation sequence mode wherein select remote sensing units are activated in series with selected other remote sensing units and a combination of the simultaneous mode and the predetermined activation sequence mode, the remote sensing units comprising at least one remote sensing unit configured to utilize a first sensing method and at least one other remote sensing unit configured to utilize a second sensing method different from the first sensing method, the first and second sensing methods comprising, respectively, one from among optical, ultrasonic, radio frequency identification, inductive, infrared, and mechanical sensing methods.

42. A method of detection, comprising:
providing multiple sensing units that are located remote from each other; and
providing a controller coupled to the multiple remote sensing units and configuring the controller to independently control each remote sensing unit in accordance with multiple modalities and to process outputs independently from each the remote sensing units, wherein providing multiple remote sensing units comprises providing at least one remote sensing unit configured to utilize a first sensing method and at least one other remote sensing unit configure to utilize a second sensing method different from the first method, the first and second sensing methods comprising, respectively, one from among optical, ultrasonic, radio frequency identification, capacitive, inductive, infrared, and mechanical sensing methods.

43. A detection apparatus, comprising:
a plurality of remote sensing units;
a single controller configured to activate each remote sensing unit discrete from the remaining remote sensing units in accordance with a selected activation sequence and selected response times in which a delay in response to a detection signal is selected, the controller configured to repeatedly scan each remote sensing unit at a scanning frequency, and to scan at least one remote sensing unit at a different frequency than the scanning frequency of at least one other remote sensing unit.

44. A scanning and control s em, comprising:
a plurality of remote sensing units;
a single controller coupled to the plurality of remote sensing units by a coupling device that is configured to enable selective positioning and selected activation of each remote sensing unit, the controller configured to activate each remote sensing unit discrete from the remaining remote sensing units in accordance with predetermined activation sequence, to receive a detection signal from each remote sensing unit, and to generate an output in response thereto in accordance with a selected delay in response time, to repeatedly scan remote sensing units at a scanning frequency, and to scan at least one remote sensing unit at a different frequency than the scanning frequency of at least one other remote sensing unit.

45. A detection system, comprising:
a plurality of remote sensing units;
a single controller coupled to the plurality of remote sensing units, the controller configured to activate each remote sensing unit in one of either a simultaneous mode and a predetermined activation sequence mode, the controller configured to activate at least one remote sensing unit at an activation frequency different than an activation frequency of at least one other remote sensing unit; and
a coupling mechanism configured to couple each remote sensing unit to the single controller and to permit selective positioning and selective response times of each remote sensing unit.

46. A detection system, comprising:
a plurality of remote sensing units;
a single controller coupled to the plurality of remote sensing units, the controller configured to selectively activate a first group of the plurality of remote sensing units in a simultaneous mode with selected other remote sensing units while activating a second group of the plurality of remote sensing units sequentially in accordance with an activation sequence mode, the controller configured to modulate at least one remote sensing unit in the second group at a different modulation frequency than a modulation frequency of at least one other remote sensing unit in the second group; and
a coupling mechanism configured to couple each remote sensing unit to the single controller and to permit selective positioning and selective response times of each remote sensing unit.

47. A detection system, comprising:
a plurality of sensing units located remote from each other;
a single controller coupled to the plurality of remote sensing units, the controller configured to selectively activate a first number of remote sensing units in a simultaneous mode with other selected remote sensing units in the first number of remote sensing units and to selectively activate a second number of remote sensing units in a predetermined activation sequence mode in sequence with other selected remote sensing units in the second number of remote sensing units;

a coupling mechanism configured to couple each remote sensing unit of the plurality of remote sensing units to the single controller and to permit selective positioning and selective response times of each remote sensing unit; and each of the plurality of remote sensing units comprising a transmitter unit and a receiver unit, and the transmitter unit comprises multiple light emitting diodes, and wherein the controller is configured to adjust the brightness of the light emitting diodes in the presence of a target to provide a visual indication to user.

48. A detection system, comprising:

a plurality of sensing units located remote from each other;

a single controller coupled to the plurality of remote sensing units, the controller configured to selectively activate each remote sensing unit in a first group of remote sensing units selected from the plurality of sensing units in a simultaneous bode with other selected remote sensing units in the first group and to selectively activate at least two remote sensing units in a second group of remote sensing units selected from the plurality of sensing units that are different from the first group, the second group activated in a predetermined activation sequence mode;

a coupling mechanism configured to couple each remote sensing unit to the single controller and to permit selective positioning and selective response times of each remote sensing unit; and the remote sensing units comprise at least one remote sensing unit configured to utilize a first sensing method and at least one other remote sensing unit configured to utilize a second sensing method different from the first sensing method, the first and second sensing methods comprising, respectively, one from among optical, ultrasonic, radio frequency identification, inductive, infrared, and mechanical sensing methods.

49. A method of detection, comprising:

providing multiple sensing units that are housed remote from each other, each sensing unit configured to transmit and detect an emitted signal;

providing a controller coupled to the multiple remote sensing units and configuring the controller to independently control each remote sensing unit in accordance with multiple modalities, including simultaneous activation of a first plurality of remote sensing units selected from the multiple sensing units and activation of a second plurality of remote sensing units selected from the multiple sensing units in accordance with a selected activation sequence, and to process outputs independently from each of the remote sensing units;

providing a coupling mechanism to couple the controller to each remote sensing unit in a manner that permits selective positioning and selective response times of each remote sensing unit; and wherein providing multiple remote sensing units comprises providing at least one remote sensing unit configured to utilize a first sensing method and at least one other remote sensing unit configured to utilize a second sensing method different from the first sensing method, the first and second sensing methods comprising, respectively, one from among optical, ultrasonic, radio frequency identification, capacitive, inductive, infrared, and mechanical sensing methods.

50. A method of detection, comprising:

providing multiple sensing units that are housed remote from each other, each sensing unit configured to transmit and detect an emitted signal;

providing a controller coupled to the multiple remote sensing units and configuring the controller to independently control each remote sensing unit in accordance with multiple modalities, including simultaneous activation of a first plurality of remote sensing units and non-simultaneous activation of a second plurality of remote sensing units, and to process outputs independently from each of the remote sensing units;

providing a coupling mechanism to couple the controller to each remote sensing unit in a manner that permits selective positioning and selective response times of each remote sensing unit;

wherein providing multiple remote sensing units comprises providing at least one remote sensing unit configured to utilize a first sensing method and at least one other remote sensing unit configured to utilize a second sensing method different from the first sensing method, the first and second sensing methods comprising, respectively, one from among optical, ultrasonic, radio frequency identification, capacitive, inductive, infrared, and mechanical sensing methods; and wherein providing the controller comprises configuring the controller to provide a visual indication to a user by adjusting brightness of light transmitted by the remote sensing units.

51. A method of detection, comprising:

providing multiple sensing units that are housed remote from each other, each sensing unit configured to transmit and detect an emitted signal;

providing a controller coupled to the multiple remote sensing units and configuring the controller to independently control each remote sensing unit in accordance with multiple modalities, including simultaneous activation of a first plurality of remote sensing units and non-simultaneous activation of a second plurality of remote sensing units in accordance with an activation sequence, and to process outputs independently from of the remote sensing units;

providing a coupling mechanism to couple the controller to each remote sensing unit in a manner that permits selective positioning and selective response times of each remote sensing unit; and wherein providing the controller comprises configuring the controller to provide a visual indication to a user by adjusting brightness of light transmitted by the remote sensing units.

* * * * *

UNITED STATES PATENT AND TRADEMARK OFFICE
CERTIFICATE OF CORRECTION

PATENT NO. : 7,251,587 B2  
APPLICATION NO. : 10/639768  
DATED : July 31, 2007  
INVENTOR(S) : Vadim Bondarev et al.

Page 1 of 1

It is certified that error appears in the above-identified patent and that said Letters Patent is hereby corrected as shown below:

<u>Column 12</u>

Line 61, "remove" should read as -- remote --

<u>Column 14</u>

Line 16, "s em" should read as -- system --

Signed and Sealed this

Thirteenth Day of May, 2008

JON W. DUDAS  
*Director of the United States Patent and Trademark Office*